United States Patent
Zhao et al.

(10) Patent No.: US 8,189,862 B2
(45) Date of Patent: *May 29, 2012

(54) VISIBLE AUTHENTICATION PATTERNS FOR PRINTED DOCUMENT

(75) Inventors: Jian Zhao, Rumford, RI (US); Justin Picard, Providence, RI (US); Niels Thorwirth, Providence, RI (US)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,394

(22) Filed: Jun. 7, 2011

(65) Prior Publication Data

US 2012/0063647 A1    Mar. 15, 2012

Related U.S. Application Data

(63) Continuation of application No. 12/807,144, filed on Aug. 27, 2010, now Pat. No. 7,991,198, which is a continuation of application No. 10/514,271, filed as application No. PCT/US03/15168 on May 14, 2003, now Pat. No. 7,809,152, which is a continuation-in-part of application No. 10/287,206, filed on Nov. 4, 2002, now Pat. No. 6,782,116.

(60) Provisional application No. 60/380,189, filed on May 14, 2002.

(51) Int. Cl.
*G06K 9/00* (2006.01)
(52) U.S. Cl. ........................................ 382/100; 380/277
(58) Field of Classification Search ................... 382/100
See application file for complete search history.

(56) References Cited

U.S. PATENT DOCUMENTS

| | | | |
|---|---|---|---|
| 4,790,566 A | 12/1988 | Boissier et al. | |
| 5,132,992 A | 7/1992 | Yurt et al. | |
| 5,315,448 A | 5/1994 | Ryan | |
| 5,319,453 A * | 6/1994 | Copriviza et al. | 346/6 |
| 5,337,361 A | 8/1994 | Wang et al. | |
| 5,384,846 A * | 1/1995 | Berson et al. | 713/186 |
| 5,394,274 A | 2/1995 | Kahn | |
| 5,502,576 A | 3/1996 | Ramsay et al. | |
| 5,613,004 A | 3/1997 | Cooperman et al. | |

(Continued)

FOREIGN PATENT DOCUMENTS

EP    1 093 104    4/2001
(Continued)

OTHER PUBLICATIONS

Written Opinion from the International Preliminary Examining Authority dated Oct. 28, 2003 in PCT/US03/15168.

(Continued)

*Primary Examiner* — Sath V Perungavoor
(74) *Attorney, Agent, or Firm* — Collard & Roe, P.C.

(57) ABSTRACT

A technique for determining authenticity of analog forms such as packaging or documents determines whether the analog form has been made directly from a digital representation or by photocopying or scanning an analog form. The technique makes the determination by comparing an original digital representation of a portion of the analog form having an authentication pattern with a digital recording of the portion from the analog form and measuring differences in features that are affected by the operations of photocopying or scanning. The authentication pattern may depend on a key or on other information displayed on the analog form. Another pattern may be displayed on the analog form to locate the pattern.

13 Claims, 12 Drawing Sheets

U.S. PATENT DOCUMENTS

| | | | |
|---|---|---|---|
| 5,636,292 | A | 6/1997 | Rhoads |
| 5,664,018 | A | 9/1997 | Leighton |
| 5,708,717 | A | 1/1998 | Alasia |
| 5,710,834 | A | 1/1998 | Rhoads |
| 5,745,604 | A | 4/1998 | Rhoads |
| 5,748,783 | A | 5/1998 | Rhoads |
| 5,768,426 | A | 6/1998 | Rhoads |
| 5,786,587 | A * | 7/1998 | Colgate, Jr. ............... 235/487 |
| 5,799,092 | A * | 8/1998 | Kristol et al. ............... 380/51 |
| 5,825,892 | A | 10/1998 | Braudaway et al. |
| 5,828,754 | A | 10/1998 | Hogan |
| 5,835,639 | A * | 11/1998 | Honsinger et al. ............ 382/278 |
| 5,841,886 | A * | 11/1998 | Rhoads ........................ 382/115 |
| 5,868,432 | A | 2/1999 | Mantegazza |
| 5,892,900 | A | 4/1999 | Ginter et al. |
| 5,907,149 | A | 5/1999 | Marckini |
| 5,949,885 | A * | 9/1999 | Leighton ........................ 380/54 |
| 5,974,150 | A | 10/1999 | Kaish et al. |
| 5,984,366 | A * | 11/1999 | Priddy ............................ 283/72 |
| 6,024,287 | A * | 2/2000 | Takai et al. ................... 235/493 |
| 6,044,156 | A | 3/2000 | Honsinger et al. |
| 6,044,182 | A | 3/2000 | Daly et al. |
| 6,108,434 | A | 8/2000 | Cox et al. |
| 6,122,392 | A | 9/2000 | Rhoads |
| 6,122,403 | A | 9/2000 | Rhoads |
| 6,141,438 | A * | 10/2000 | Blanchester ................. 382/140 |
| 6,141,753 | A | 10/2000 | Zhao et al. |
| 6,154,571 | A | 11/2000 | Cox et al. |
| 6,185,312 | B1 | 2/2001 | Nakamura et al. |
| 6,243,480 | B1 * | 6/2001 | Zhao et al. .................... 382/100 |
| 6,266,430 | B1 | 7/2001 | Rhoads |
| 6,278,792 | B1 | 8/2001 | Cox et al. |
| 6,285,774 | B1 | 9/2001 | Schumann et al. |
| 6,285,775 | B1 * | 9/2001 | Wu et al. ....................... 382/100 |
| 6,285,776 | B1 | 9/2001 | Rhoads |
| 6,289,108 | B1 | 9/2001 | Rhoads |
| 6,292,092 | B1 * | 9/2001 | Chow et al. ..................... 340/5.6 |
| 6,311,214 | B1 | 10/2001 | Rhoads |
| 6,332,031 | B1 | 12/2001 | Rhoads et al. |
| 6,343,138 | B1 | 1/2002 | Rhoads |
| 6,345,104 | B1 | 2/2002 | Rhoads |
| 6,389,151 | B1 * | 5/2002 | Carr et al. ..................... 382/100 |
| 6,411,725 | B1 | 6/2002 | Rhoads |
| 6,418,232 | B1 * | 7/2002 | Nakano et al. ................ 382/100 |
| 6,442,284 | B1 * | 8/2002 | Gustafson et al. ............ 382/100 |
| 6,449,378 | B1 * | 9/2002 | Yoshida et al. ............... 382/100 |
| 6,487,301 | B1 | 11/2002 | Zhao |
| 6,519,351 | B2 | 2/2003 | Kimura et al. |
| 6,535,614 | B1 * | 3/2003 | Kimura et al. ................ 382/100 |
| 6,535,617 | B1 | 3/2003 | Hannigan et al. |
| 6,546,112 | B1 | 4/2003 | Rhoads |
| 6,563,937 | B1 | 5/2003 | Wendt |
| 6,580,819 | B1 | 6/2003 | Rhoads |
| 6,608,911 | B2 * | 8/2003 | Lofgren et al. ............... 382/100 |
| 6,636,614 | B1 | 10/2003 | Koeppen et al. |
| 6,636,615 | B1 | 10/2003 | Rhoads et al. |
| 6,665,419 | B1 | 12/2003 | Oami |
| 6,744,906 | B2 | 6/2004 | Rhoads et al. |
| 6,751,336 | B2 | 6/2004 | Zhao |
| 6,795,565 | B2 | 9/2004 | Wendt |
| 6,823,075 | B2 | 11/2004 | Perry |
| 6,885,757 | B2 | 4/2005 | Bloom et al. |
| 6,934,403 | B2 * | 8/2005 | Joo et al. ....................... 382/100 |
| 6,940,993 | B2 | 9/2005 | Jones et al. |
| 7,016,516 | B2 | 3/2006 | Rhoads |
| 7,043,052 | B2 | 5/2006 | Rhoads |
| 7,054,461 | B2 | 5/2006 | Zeller et al. |
| 7,054,462 | B2 | 5/2006 | Rhoads et al. |
| 7,171,020 | B2 | 1/2007 | Rhoads et al. |
| 7,236,610 | B1 * | 6/2007 | Luo et al. ...................... 382/100 |
| 7,349,553 | B2 * | 3/2008 | Rodriguez ................... 382/100 |
| 7,366,907 | B1 | 4/2008 | Ezaki |
| 7,369,677 | B2 | 5/2008 | Petrovic et al. |
| 7,400,743 | B2 | 7/2008 | Rhoads et al. |
| 7,480,802 | B2 * | 1/2009 | Venkatesan et al. .......... 713/176 |
| 7,716,487 | B2 * | 5/2010 | Venkatesan et al. .......... 713/176 |
| 7,809,152 | B2 | 10/2010 | Zhao et al. |
| 2001/0005423 | A1 | 6/2001 | Rhoads |
| 2001/0019618 | A1 | 9/2001 | Rhoads |
| 2001/0020270 | A1 | 9/2001 | Yeung et al. |
| 2001/0022848 | A1 | 9/2001 | Rhoads |
| 2001/0031065 | A1 | 10/2001 | Rhoads |
| 2001/0033661 | A1 | 10/2001 | Prokoski |
| 2001/0037455 | A1 | 11/2001 | Lawandy et al. |
| 2002/0009208 | A1 | 1/2002 | Alattar et al. |
| 2002/0012445 | A1 | 1/2002 | Perry |
| 2002/0023218 | A1 | 2/2002 | Lawandy et al. |
| 2002/0054355 | A1 | 5/2002 | Brunk |
| 2002/0061121 | A1 | 5/2002 | Rhoads et al. |
| 2002/0064298 | A1 | 5/2002 | Rhoads et al. |
| 2002/0095577 | A1 | 7/2002 | Nakamura et al. |
| 2002/0099943 | A1 | 7/2002 | Rodriguez et al. |
| 2002/0106103 | A1 | 8/2002 | Jones et al. |
| 2002/0157005 | A1 | 10/2002 | Brunk et al. |
| 2002/0170966 | A1 | 11/2002 | Hannigan et al. |
| 2002/0171862 | A1 | 11/2002 | Nagashige |
| 2002/0178368 | A1 | 11/2002 | Yin et al. |
| 2003/0002710 | A1 | 1/2003 | Rhoads |
| 2003/0095683 | A1 | 5/2003 | Najarian |
| 2003/0128863 | A1 * | 7/2003 | Hayashi ........................ 382/100 |
| 2003/0156733 | A1 | 8/2003 | Zeller et al. |
| 2003/0159046 | A1 * | 8/2003 | Choi et al. .................... 713/176 |
| 2004/0001610 | A1 | 1/2004 | Murakami |
| 2004/0091050 | A1 | 5/2004 | Choi et al. |
| 2004/0153649 | A1 | 8/2004 | Rhoads et al. |
| 2006/0015713 | A1 * | 1/2006 | Rhoads ......................... 713/150 |
| 2006/0109515 | A1 | 5/2006 | Zhao et al. |
| 2006/0269162 | A1 | 11/2006 | Chen et al. |

FOREIGN PATENT DOCUMENTS

| | | |
|---|---|---|
| EP | 1 168 817 | 1/2002 |
| JP | 6258982 | 9/1994 |
| JP | 2000-059604 | 2/2000 |
| JP | 2000-311266 | 11/2000 |
| JP | 2001-024873 | 1/2001 |
| JP | 2001-344557 | 12/2001 |
| JP | 2001-358931 | 12/2001 |
| JP | 2002-084413 | 3/2002 |
| JP | 2002-344736 | 11/2002 |
| JP | 2002-368992 | 12/2002 |
| WO | WO 99/49420 | 9/1999 |
| WO | WO 00/58928 | 10/2000 |
| WO | WO 01/15382 | 3/2001 |
| WO | WO 01/31630 | 5/2001 |
| WO | WO 01/43086 | 6/2001 |
| WO | WO 02/01513 | 1/2002 |
| WO | WO 02/31752 | 4/2002 |
| WO | WO 02/37309 | 5/2002 |

OTHER PUBLICATIONS

English translation of Japanese Office Action dated Mar. 24, 2010 in JP 2007-313195.
European Office Action dated Apr. 22, 2010 in EP 03 728 904.8.
International Search Report in PCT/US03/15168, Jul. 3, 2003.
Japanese Examination Report dated Oct. 13, 2010 in JP 2007-313195 along with an English translation of same.

* cited by examiner

501

502

503

601

701

1101

1103

VISIBLE AUTHENTICATION PATTERNS FOR PRINTED DOCUMENT

CROSS REFERENCES TO RELATED APPLICATIONS

This application is a continuation of and Applicants claim priority under 35 U.S.C. §120 of parent U.S. patent application Ser. No. 12/807,144 filed on Aug. 27, 2010, which parent application in turn is a continuation of and Applicants claim priority under 35 U.S.C. §120 of U.S. patent application Ser. No. 10/514,271 filed on Nov. 12, 2004, now U.S. Pat. No. 7,809,152, which is the National Stage of PCT/US03/15168 filed on May 14, 2003, which claims priority from U.S. Provisional Application 60/380,189, Method and Apparatus for Copy Protection with Copy-Detectable Patterns, having the same inventors as the present application and filed May 14, 2002, the disclosures of each of which applications are incorporated by reference, and further claims priority from and is a continuation-in-part of U.S. Ser. No. 10/287,206, J. Zhao, et al., Apparatus and methods for improving detection of watermarks in content that has undergone a lossy transformation, filed Nov. 4, 2002, now U.S. Pat. No. 6,782,116. The sections Watermarks that are embedded using message-based keys and Using watermarks to locate alterations in digital documents and analog documents made from digital documents from that application are included in their entirety in the present application. All of U.S. Ser. No. 10/287,206 is further incorporated by reference herein for all purposes.

BACKGROUND OF THE INVENTION

1. Field of the Invention

The invention relates generally to security features in printed documents and more specifically to visible authentication patterns in printed documents. The visible authentication patterns can be used to distinguish original printed documents from photocopies of those printed documents, to detect alterations in documents, and to carry hidden and/or visible messages.

2. Description of Related Art

A prerequisite for a commercial society is being able to distinguish authentic items from false or counterfeit items. With documents, the questions that may need to be answered to determine a document's authenticity include the following:

Is the document an original or a copy of an original?
Has the document been altered since it was first made?
Is the document authorized?

Many techniques have been developed to make it reasonably possible to answer these questions from the document itself. Techniques which make it easier to determine whether a document is an original or a copy include the complex etchings used in paper money, the photographs used in ID cards, and special papers. Special papers and inks have been used to detect alterations. Techniques for showing that a document is authorized have included signatures and seals.

With the advent of digital scanning and printing techniques, digital watermarks have been used to authenticate printed documents. A digital watermark is a message that is embedded in a digital representation of a document by adding noise that carries the message to a graphic element in the document. When used for authentication purposes, the message is generally invisible and can be read only if the location of the information making up the message in the graphic element is known. For a survey of digital watermarking techniques, see Appendix A, beginning at col. 17, line 27 of U.S. Pat. No. 6,345,104, Rhoads, Digital watermarks and methods for security documents, issued Feb. 5, 2002, which is incorporated herein by reference for all purposes. For an example of how digital watermarks may be used for authentication purposes, see U.S. Pat. No. 6,243,480, Jian Zhao, Digital authentication with analog documents, issued Jun. 5, 2001.

Progress in the technology of copying has diminished the value of all of the techniques that permit one to determine from the appearance of a document whether it is authentic. Because of this progress, counterfeiting not only of money and financial instruments, but also of other documents such as ID cards and diplomas as well as of packaging and labels causes huge losses, ranging to 5% to 8% of worldwide sales of branded products, and endangers the reputation and value of the brands themselves. Moreover, the growth of the Internet drives the business of counterfeited documents (fake IDs, university diplomas, checks, and so on), which can be bought easily and anonymously from hundreds of companies on the Web. As the precision of scanners, digital imaging software and printers increase, the problem will only get worse.

What is needed as the scanners, digital imaging software, and printers get better is new ways of adding information to a document to make it possible to determine whether it is an original or a copy, whether it has been altered, and/or whether it has been authorized. Efforts in this area have included the following:

Embedding Multiple Watermarks in a Document

U.S. Pat. No. 6,332,031, Rhoads, et al., Multiple watermarking techniques for documents and other data, issued Dec. 18, 2001, discloses embedding several watermarks in the document, each of them with different properties or in different domains. If the document is photocopied or scanned and printed in order to produce a counterfeit, the embedded watermarks will be altered or damaged. The properties of the watermark or the domain in which it is embedded will affect the degree to which it is altered by the copying process. Thus, the relative degree of alteration of each watermark can indicate whether the document is an original or copy. The use of watermarks in this fashion has a number of advantages:

It is flexible: a digital watermark can in theory be inserted into any document, because it merely introduces unnoticeable modifications to the document.

Because it is invisible, it can be used to determine the source of the counterfeits.

The possible presence of watermarks forces the counterfeiter to reproduce the whole document with very high fidelity.

The advantages of watermarks are also their disadvantages. Because digital watermarks used for security purposes are made by adding invisible noise to a document, they often cannot be read where the document that contains them has been subject to wear and tear. Because they are hidden in the noise in a document, it is difficult to hide the watermarks in documents such as banknotes where every element of the design is fixed and there is thus no room for noise.

Embedding Information that Cannot be Reproduced by a Photocopier

A document may contain a part which is invisible in the visible light range because it is printed with an ink that is visible in ultra-violet light. The photocopier, which operates using visible light, cannot reproduce it. See U.S. Pat. No. 5,868,432, Mantegazza, Documents with anticopying means to prevent reproducibility by photocopying, issued Feb. 9, 1999.

The information may still require more resolution than the scanning-printing process is capable of. See U.S. Pat. No. 5,708,717, Alosia, Digital anti-counterfeiting software method and apparatus, issued Nov. 13, 1998, which discloses a method for combining a source image and a latent image which is visible only when viewed through a special decoder lens. This latent image can, for example contain the words "authentic" repeated several time, or more document-specific information such as the personal information in the portrait of a ID card. However, since the latent image is printed with "sub-pixel" precision, it cannot be easily reproduced. Of course, what is "sub-pixel" today may be easily reproducible tomorrow.

Holograms are inserted on documents such as ID cards and banknotes because they are assumed to be easy to detect by the human eye and hard to reproduce with high fidelity. However, while anyone can see whether a hologram is present on a document, an untrained observer will generally be unable to detect whether the hologram is authentic or a copy.

Common Problems of Invisible Copy Protection Features

A problem that all of the invisible copy protection features have is that their invisibility makes them completely useless to people who do not have the special instruments needed to read them. Moreover, the invisibility of the features causes problems with printing and/or detection. With the watermarks, the need to keep the watermarks invisible necessarily makes them hard to detect, and that is particularly the case when wear and tear add extra noise to a document. With invisible ink, both printing and detection are complicated, and that is also the case with latent images printed with "sub-pixel precision".

What is needed is techniques that can reliably determine, at a lower cost, whether a document is an original or a copy, whether the document has been altered, or whether it is authorized, that make it possible for the public to see that a document may be easily authenticated, and that can be easily integrated with other techniques for authenticating a document. It is an object of the inventions disclosed herein to provide such techniques.

SUMMARY OF THE INVENTION

The object of the invention is attained in one aspect by techniques for determining whether an analog form of an object is an original analog form, that is, an analog form made from an original digital representation instead of by photocopying or scanning an analog form. In a method employing the techniques, a portion of a digital recording made from the analog form is compared with an original digital representation of the portion of the analog form to determine a degree of dissimilarity between the recorded portion and the original digital representation of the portion and using the degree of dissimilarity to determine whether the analog form is an original analog form. A further characteristic of the invention is that the dissimilarity that is determined is a dissimilarity that is caused by operations involved in making a non-original analog form.

Other characteristics of this aspect are practicing the method in a node in a network which receives the digital recording from another node in the network and returning an indication to another node whether the analog form has been determined to be an original analog form, as well as practicing the method in a processor to which a digital recording device and an output device are attached. The processor makes the digital recording from input received from the digital recording device and provides an indication whether the analog form has been determined to be an original analog form to the output device.

In an advantageous embodiment of the invention, the original digital representation of the portion has a noisy pattern. The original digital representation may be made using a key and the original digital representation may have a function in the analog form in addition to permitting determination of whether the analog form is original. The function may be to serve as a barcode or a background image or to carry a message.

Another aspect of the invention is a method of performing an authenticity check on an analog form. The method compares a digital recording of a noisy pattern in the analog form with an original digital representation of the noisy pattern and the result of the comparison is used to perform the authenticity check. The technique may be used to determine whether a portion of the noisy pattern has been destroyed in the analog form. The noisy pattern may further contain a message.

Still another aspect of the invention is a method of hiding a message in an analog form In the method, a digital representation of a visible noisy pattern in which the message has been hidden is made and is included in the analog form.

Other objects and advantages will be apparent to those skilled in the arts to which the invention pertains upon perusal of the following Detailed Description and drawing, wherein:

Figure 1:
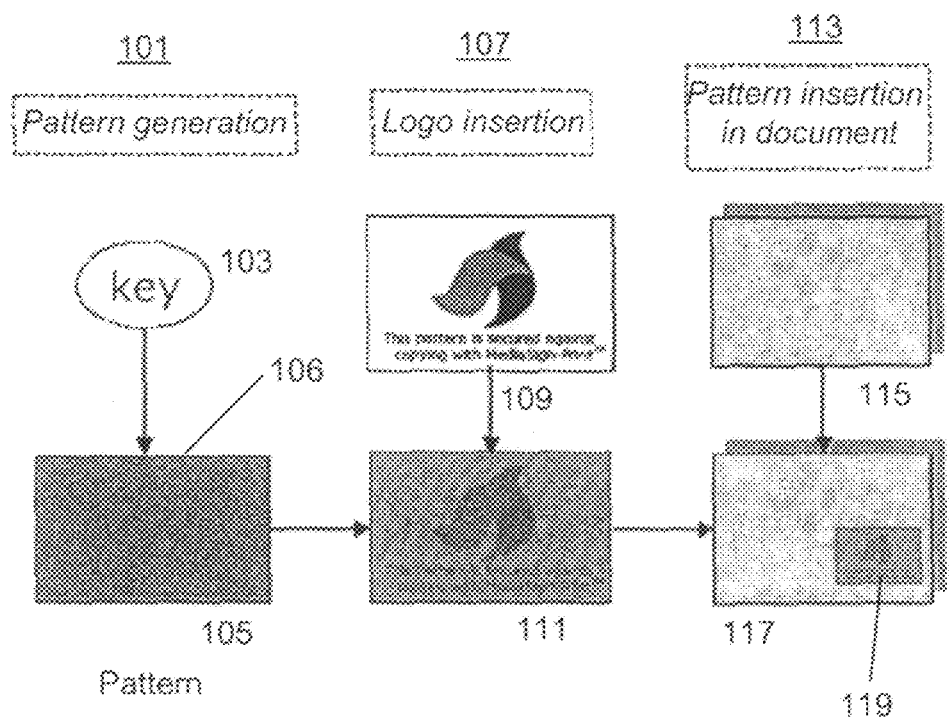
FIG. 1 is an overview of how a visible authentication pattern (VAP) is generated and inserted into a document.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

Using the Mere Presence of Watermarks to Authenticate a Document

Generally speaking, authentication techniques for documents which involve watermarks use the watermark to hide some kind of authentication information for the document in a graphical element in the document. An example is using the watermark to hide a digest made from the document's character codes, as explained in U.S. Pat. No. 6,243,480, cited above. A difficulty with techniques that use watermarks to hide authentication information in a graphical element of a document is that wear and tear on the document often renders the watermark unreadable.

U.S. Ser. No. 10/287,206, the parent of the present application, explores ways of obtaining at least some information from unreadable watermarks and ways of making watermarks more robust in the face of lossy transformations such as those caused by wear and tear on a document. Among the things that the inventors of U.S. Ser. No. 10/287,206 realized in the course of their work were first, that a watermark's mere presence could be used to authenticate a document, and second, that the mere presence of a watermark could be used to discover where a document had been altered. The portions of U.S. Ser. No. 10/287,206 that deal with these realizations follow.

Figure 8:
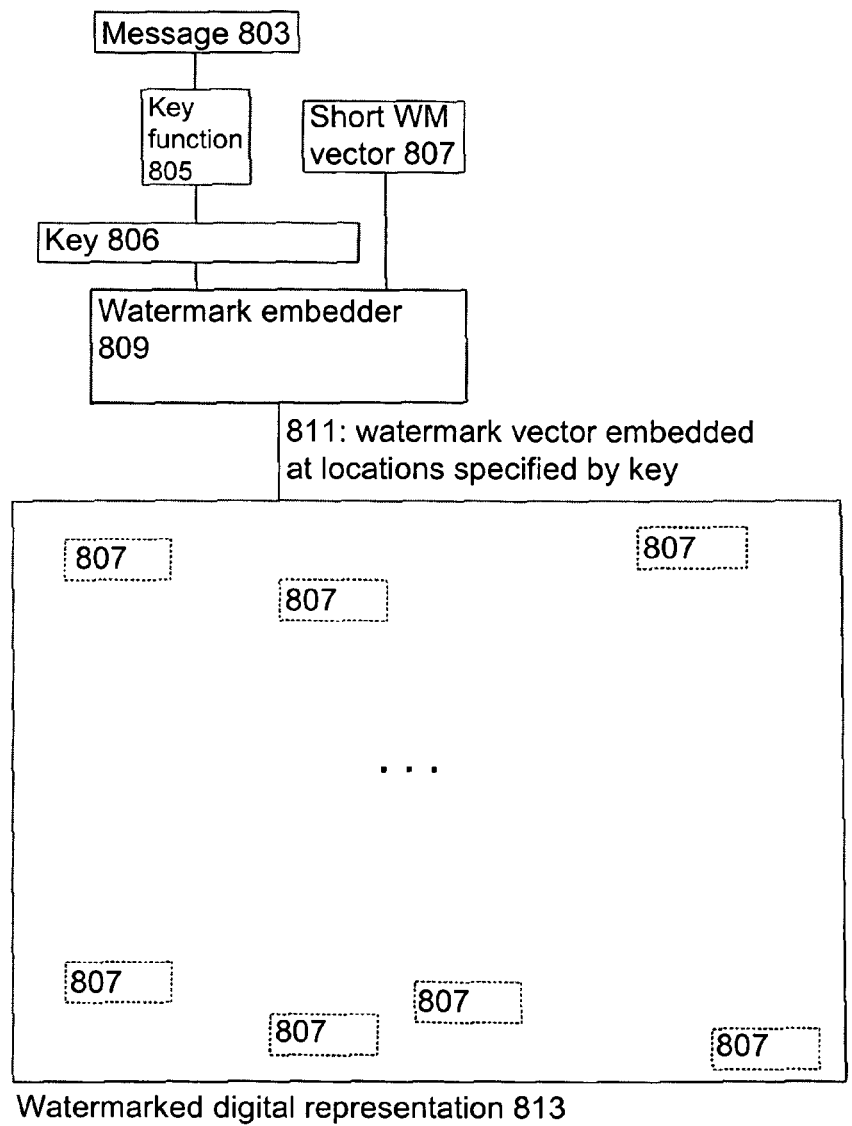
FIG. 8 shows how a message-based key can be used to embed a contentless watermark in an image.
Figure 9:
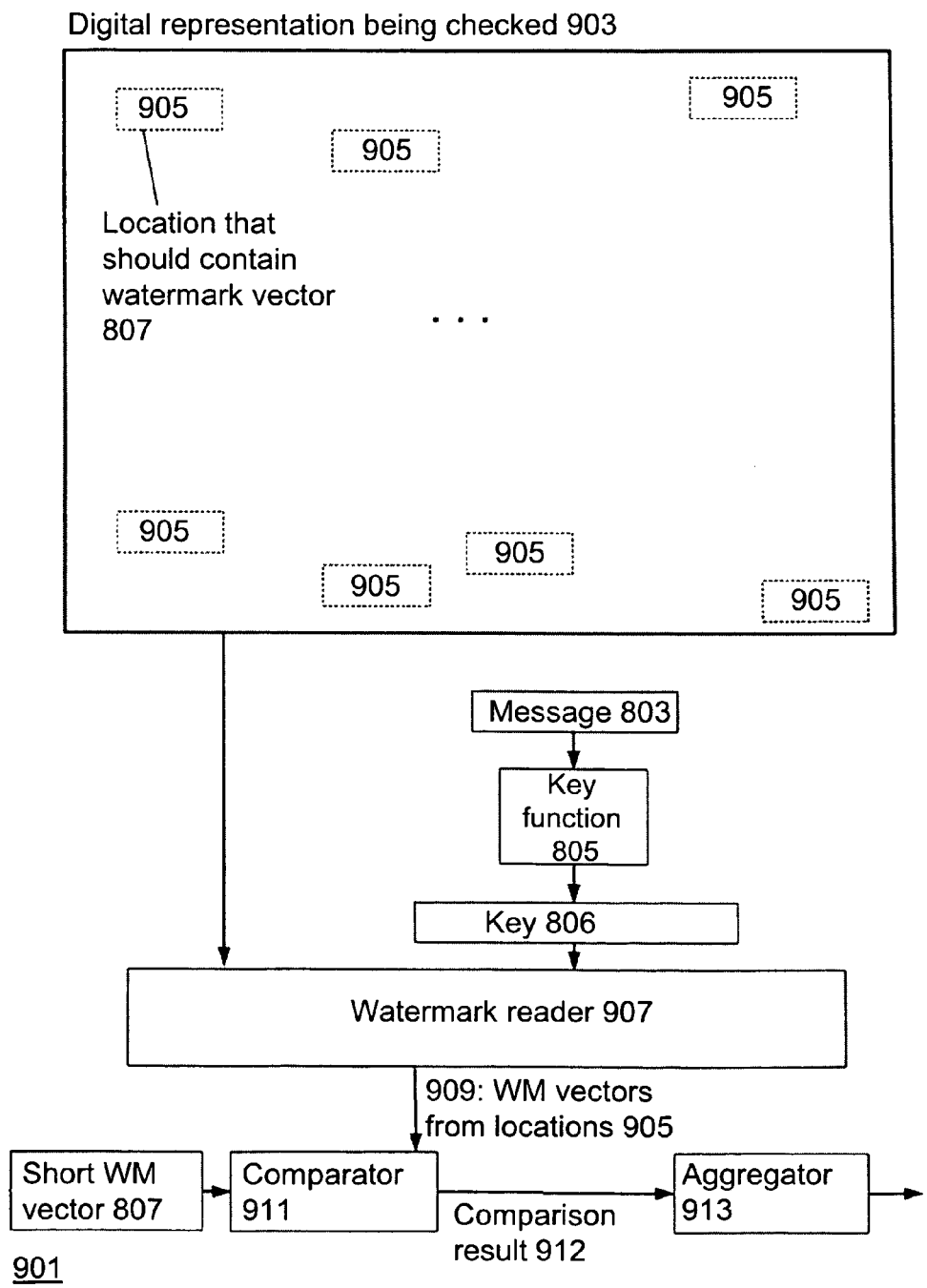
FIG. 9 shows a technique for determining whether a particular digital representation is derived from a digital representation which was watermarked using a message-based key.

Watermarks that are Embedded Using Message-Based Keys: FIGS. 8 and 9

The standard application of digital watermarks is to hide a message in a digital representation. One of the uses of such a message is validating or authenticating the digital representation: the digital representation being validated is believed to contain a watermark which contains a particular message; the watermark is read and its contents are compared with the particular message. If they agree, the digital representation is valid or authentic. When the digital representation has undergone a lossy transformation, the watermark may become unreadable; the techniques discussed in U.S. Ser. No. 10/287,206 permit limited validation or authentication in such situations. A general problem with validation by means of messages contained in watermarks is that validation often involves long messages such as social security numbers or account numbers, while watermarks containing such long messages are less robust than watermarks containing short messages, and are therefore more likely to be rendered unreadable by lossy transformations.

A solution to this general problem is based on the observation that for validation or authentication purposes, there is no need that the watermark actually contain the message that forms the basis for the validation or authentication; all that is required is that a given watermark will be present in a digital representation only if the watermark was made using the message that forms the basis for the validation. In that case, there is no need for the watermark to be readable; instead, the mere presence of the watermark permits the digital representation to be validated. Moreover, because it is the watermark's presence and not its content that shows that the digital representation is valid or authentic, the watermark's content need do nothing more than indicate the watermark's presence and need be no longer than is required to do that; indeed, the watermark vector for a such a watermark need only specify the value of a single bit. This in turn makes such watermarks far more robust than watermarks that contain the message that forms the basis for the validation or authentication.

One way of making a watermark whose mere presence in a digital representation validates or authenticates the digital representation is to use the message to determine the location of the watermark in the digital representation. This is shown at 801 in FIG. 8. A key function 805 ($f$) is used to make a key 806(K2) from a message 803 ($m$): $K2=f(m)$; where required, the function 805 may use a secret key K1 as well as m to make the key: $K2=f(K1,m)$. Key 806 is then provided to watermark embedder 809 along with a short (minimum 1 bit) watermark vector WM 807 and watermark embedder 809 embeds a watermark made using watermark vector 807 at the locations in watermarked digital representation 813 indicated by key 806. The watermark is shown in FIG. 8 by the dotted boxes labeled 807 in digital representation 813. Since message 803 is now no longer contained in the watermark, but instead used to make key 806 and short watermark vector 807 need only be 1 bit in length, the length of the message has no effect whatever on the robustness of the watermark. As is well known in mathematics, there are many functions which can be used to generate key 806 from message 803 in a fashion such that key 806, and thus the watermark made with it, is unique to the message. The degree of uniqueness required may of course vary with the application. In some cases, the function may be an identity function, i.e., the key is the message itself. An advantage of the technique is that the function determines the length of the watermark key, and thus, the key can be made as long as is required for a particular application.

FIG. 9 shows at 901 a system that determines whether a digital representation 903 that is believed to contain a watermark made in the manner just described is authentic. Digital representation 903 contains a set of locations 905 that should contain watermark vector 807 if digital representation 903 is in fact derived from digital representation 813. The locations are at positions which in digital representation 813 were determined by key 806. The system that is doing the authentication obtains message 803 and also obtains or is in possession of key function 805. Key function 805 is applied to message 803 to produce key 806 as described above. The system then provides key 806 to watermark reader 907, which uses it to find locations 905. When a location is found, it is output to comparator 909, as shown at 909. Short watermark vector 807 is also in possession of system 901, and it is provided to comparator 911 to compare with the value of each of the locations 905 in turn. The result 912 of each comparison goes to aggregator 913, where the results are aggregated to produce overall result 915, which indicates whether the watermark that was embedded in digital representation 813 is present in digital representation 903. Comparator 911 and aggregator 913 can use any of the techniques previously discussed with regard to unreadable watermarks for doing the comparison and the aggregation. As described below for the techniques used with unreadable watermarks, the pattern of locations 905 that match the watermark in digital representation 813 may be used to show locations at which digital representation 903 has been altered.

In some applications, aggregator 913 will produce a visual result of the comparison. An example of such a comparison is shown at 501 in FIG. 5. There, the blocks to which the watermark was applied have different shades depending on the extent to which the presence of the watermark was detected. The lighter the block is, the stronger the presence of the watermark in the block. Because image 501 has undergone lossy transformations, the distribution of blocks with strong watermarks will not be the same as in the original, but the errors caused by the lossy transformations are random, and consequently, if the image is authentic, all areas which contain the watermark should have roughly the same distribution of light blocks as shown at 501, This visualization technique can of course be used as well with watermarks in which the message determines the watermark's contents.

Using Watermarks to Locate Alterations in Digital Documents and Analog Documents Made from Digital Documents One way of attacking a digital document or an analog form made from the digital document is locally modifying an image in the document or form to change its semantic content. Examples of local modifications can be:
- modifying the plate number on the image of a car captured by a DVR on the scene of an accident/crime; or
- modifying areas of the portrait on an ID card; or
- replacing the portrait on an ID document.

If the document or form is watermarked, the counterfeiter's goal is to change the semantic content of the digital document or form without rendering the watermark incorrect or unreadable. In general, when a watermark is robust enough to be readable, it will not be difficult for the counterfeiter to make small changes in the document or form without rendering the watermark incorrect or unreadable. On the other hand, the very robustness of the watermark makes it useful for detecting and tracking alterations.

In order to use a watermark to locate an alteration, one need only know the locations at which the watermark is expected to be and its watermark vector. Since the technique does not require that the watermark have any particular content, the watermark vector need only be a single bit. Once the detector knows the watermark locations and the watermark vector, the detector can use the watermark vector w' which is a replica of the original watermark's watermark vector w and compare w' with the watermark w" in the questionable content. Differences between w' and w" may show whether the digital document or analog form that is the source of the questionable content has been modified and if so, which portions were modified.

In more detail, the detector compares the watermark vector w" in each subpart (termed herein a block) of the digital document or analog form with vector w'. The comparison indicates whether each block of the document or form holds the correct watermark information. In a digital document, if there has been no alteration, most blocks will contain the correct watermark information. With analog forms, the print-and-scan process deteriorates the watermark, and consequently, not all blocks will hold the correct watermark information (e.g. there can be in the order of 20% to 40% errors). These printing and scanning errors are generally of random nature and therefore can be expected to be distributed more or less uniformly on the analog form. Thus, if the image has been locally altered and has thereby lost its watermark in the altered areas, the watermark detector will respond to the altered areas in the same way that it responds to areas that are not watermarked. In doing so, the watermark detector detects the alteration. The technique can also be used to show the strength of the watermark in each area of the image.

The replica watermark vector used to detect alterations or watermark strength may come from any source. Examples include the original image, a watermark vector from the questionable content that has been successfully read, or a watermark vector which has been generated anew from the message. Adaptive embedding and detection may be used to increase the effectiveness of detecting alterations. For example, areas of the content that need special protection against change may receive watermarking of a greater strength than other areas of the content, and the greater strength of the watermarking in these areas may be taken into account when the watermarks are analyzed as described above. Of course, the technique as used to show the strength of the watermark in each area of the image may be employed to aid in the design of masks for adaptive embedding and detection.

Different techniques inspired by statistics, signal processing or pattern recognition can be applied to automatically detect areas that contain an abnormally large number of blocks that hold incorrect information (or no information at all). For example, one technique inspired from pattern recognition is to determining connections of incorrect blocks, and extract those connections that are higher than a threshold. Another technique would be to determine in all areas of size N×N of the analog form whether there are more than P incorrect blocks. Yet another technique from signal processing is to assign positive values to correct blocks and negative values to incorrect blocks and then low-pass filter the resulting matrix. The areas of the filtered matrix in which values are under a threshold are detected as having been altered. Finally, statistics can be applied in all approaches to characterize areas of the images that are not altered and those that are altered, and to determine detection parameters relatively to the user's expectation (e.g. minimum size of altered areas, probability of false alarm/rejection, etc). It is also possible to display to the user an image with the incorrect and correct blocks in different colors, to allow human interpretation of the data.

Figure 5:
FIG. 5 shows GUIs for watermark detection and alteration detection.
Figure 5:
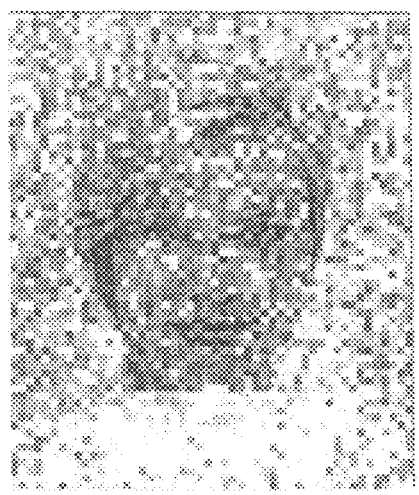
Figure 5:
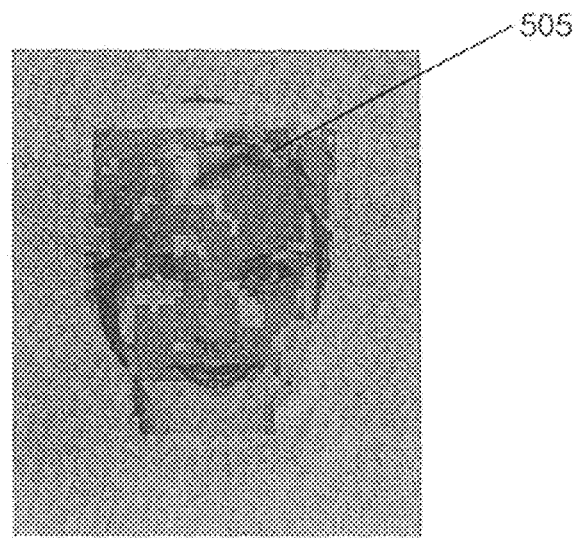

FIG. 5 shows the effect of alterations on watermark strength and also provides an example of a graphical way of showing altered areas. Here, image 501 was modified after it was watermarked by replacing the face in with another face which was not watermarked in the way that the face in image 501 was watermarked. The result of the modification is image 502. When image 502 is compared with image 501, it will be seen that the facial area of image 502 is darker than the facial area of image 501. This in turn shows that the blocks in the facial area of image 502 are far more weakly watermarked than the blocks in the facial area of image 501. The weak watermark in the facial area of image 502 is of course a direct consequence of the modification. When a filter is applied that highlights areas with many weak blocks, the result is image 503, in which modified area 505 clearly stands out.

Extensions of the Technique
  Detecting more than one altered area
    Using external modules (e.g. face recognition), to focus detection of alteration on the most semantically significant areas (e.g. the eyes in an ID photo)
    Multiple scanning of physical document to cancel out scanning variability.
  If the watermark is unreadable, the alteration detection may be used for analyzing the reasons for its unreadability.

Visible Authentication Patterns

The foregoing realizations were followed by the realization that led to the present invention: when a watermark's mere presence is being used to determine authenticity of an analog form, the watermark is being used as a contentless pattern. Since the pattern has no content, there is no longer any need for it to be invisible; instead, it can be added to the document as a visible element. In the following, visible patterns that are used for authentication are termed visible authentication patterns or VAPs. Because the VAP is visible, it is far easier to detect than is a watermark. It is, however, still able to perform all of the authentication functions of invisible watermarks and in addition lets consumers of the document know that the document's authenticity is protected.

Terminology

The following terminology will be used in the Detailed Description to clarify the relationships between digital representations and analog forms.

A digital representation of an object is a form of the object in which the object can be stored in and manipulated by a digital processing system. Objects may be or include as components documents, images, audio, video, or any other medium of which a digital representation can be made.

an analog form of a digital representation is the form of an object or component that results when the digital representation is output to an analog device such as a display, printer, or loudspeaker.

a digital recording of an analog form is a digital representation made from the analog form. The manner in which the digital recording is made depends upon the medium; for example, for a documents or an image, digital recording is done by digitizing an image made from an analog form of the document or image.

an original digital representation is a digital representation made or copied by someone authorized to do so; an original analog form is one made from an original digital representation.

a non-original digital representation is one that is made by digitally recording an analog form without authorization; a non-original analog form is made from a non-original digital representation or by photocopying an analog form.

a document will be given the special meaning of any analog form which is produced by a printing process, including documents in the more usual sense of the word, labels, packaging, and objects that are themselves imprinted. To the extent that reasonable analogies can be made, everything in the following that is said about documents may be applied also to other media. For example, an audio analog form may include an audible authentication pattern that is the audio equivalent of the VAP.

Making a Visible Authentication Pattern: FIG. 1

The paradox of the visible authentication pattern is that while the pattern is visible, a possible counterfeiter must not be able to modify the pattern so that it will authenticate a document that is not authentic. This end is achieved in a preferred embodiment by making the pattern noisy, i.e., a large part of the value of the pixels making up the pattern is apparently randomly determined. Because the pattern is noisy, it is impossible to tell what values the pixels making up the digital representation of the pattern should have without access to the original digital representation of the pattern. On the other hand, given the original digital representation of a VAP, one can compare a digital recording of a VAP from a document with the VAP's original digital representation, determine how the recorded VAP has been altered with regard to the VAP's original digital representation, and can determine from the differences how the document in question has been altered. As will be seen in more detail in the following, alterations that can be detected include those involved in making non-original documents and those involved in altering information in a document.

FIG. 1 shows one way of making a visible authentication pattern and inserting it into a document. There are three steps:
  generating a digital representation of the pattern, shown at 101;
  an optional step of adding a visible logo or legend to the authentication pattern, shown at 107; and
  inserting the authentication pattern into the document, shown at 113.

The original digital representation of the pattern 105 can be generated in any way which produces a result in which the pattern's pixels appear to have values with a strong random component. The digital representation of pattern 105 may be a gray-scale pattern, or it may employ colored pixels. It is particularly useful to employ a key to generate the pattern; the key 103 is used as a seed for a pseudo-random number generator which produces the sequence of values which are given to the pixels in the pattern. Uses of the key will be explained in detail later. The original digital representation of pattern 105 may also include components which aid in locating the pattern in a digital representation made by scanning a document that contains pattern 105. In pattern 105, black border 106 performs this function.

A visible logo or legend 109 can be added to the original digital representation of pattern 105 to make the original digital representation of pattern 111 without compromising pattern 105's noisiness because only a part of the value of the pixels making up the pattern need be randomly determined. Thus, the logo or legend can be superimposed on pattern 105 by manipulating the values of the pixels making the logo or legend in a way that preserves their randomness while causing the logo or legend to appear. For example, if pattern 105 is a gray scale pattern, the legend or logo can be made by making the pixels of the legend or logo uniformly darker or lighter relative to their original random values. The technique is similar to adding a visible watermark to an image, except that it preserves the noisiness of pattern 105.

Once the original digital representation of pattern 111 has been made, it is inserted into the original digital representation of the document 115, as shown at 113. When document 117 is printed from original digital representation 115, document 117 includes printed visible authentication pattern 119. Of course, the document may be printed onto a substrate that already has printed material on it. Thus, pattern 119 may be added to a preprinted substrate.

Figure 2:
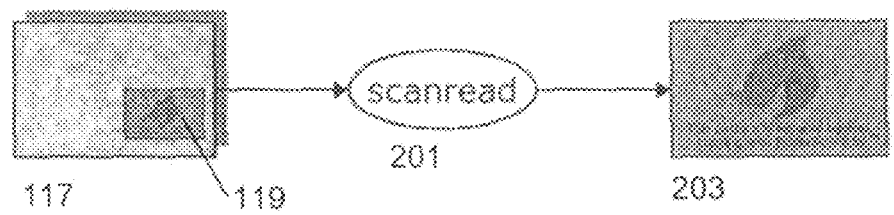
FIG. 2 how a VAP is recorded from a document.
Figure 3:
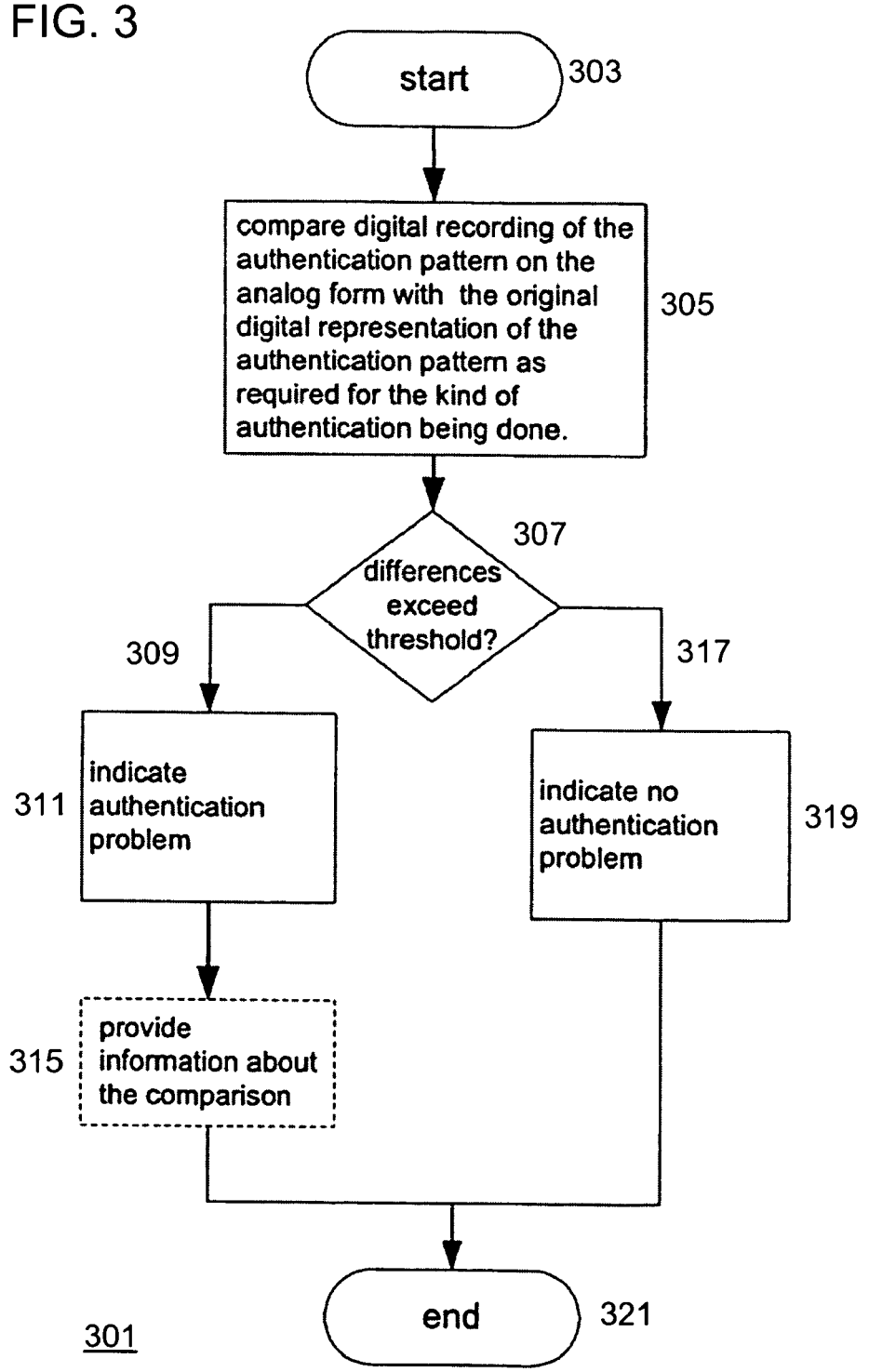
FIG. 3 is a flowchart showing in overview how a VAP can be used in authentication.

Using a Visible Authentication Pattern to Authenticate a Document: FIGS. 2 and 3

When a document that contains a printed VAP 119 is authenticated, the following happens:
  a printed VAP 119 is detected in the document.
  a digital recording of the detected printed VAP 119 is made.
  the digital recording of the printed VAP is compared with the original digital representation of the VAP; and
  authenticity is determined on the basis of the comparison.

The manner in which the digital recording of the printed VAP is compared with the original digital representation of the VAP depends on the kind of authentication being done; further, the authentication of a given document may involve several different kinds of comparisons being made between the digital recording and the original digital representation. For example, a digital recording of a visible authentication pattern on the amount field of a check may first be compared with the original digital representation to determine whether the check is a counterfeit and second to determine whether the amount in the amount field has been altered.

FIG. 2 shows detecting the printed VAP and making a digital recording of the VAP in a preferred embodiment. Both are done using the "Scanread" application program available from MediaSec Technologies. Other applications that detect a portion of a document and make a digital recording of it may also be employed. Scanread 201 uses black border 106 to detect the presence of visible authentication pattern 119 in printed document 117 and then makes digital recording 203 of visible authentication pattern 119. FIG. 3 shows a general flowchart 301 of a program that uses digital recording 203 and original digital representation 111 of VAP 119 to determine authenticity. Original digital representation 111 of the VAP may be the original itself, a copy of the original, or a new original digital representation 111 made in exactly the same way as the first original digital representation. Original digital representations obtained by any of these methods are of course exactly equivalent, and which method is used is a matter of implementation issues such as the cost of storage for the original digital representation of the VAP, the cost of transmitting the original digital representation of the VAP across a network, and the cost of generating the original digital representation each time it is required.

Beginning at 303, features of digital recording 203 and original digital representation 111 are compared at 305; what features are compared and how they are compared depends on the kind of authentication being done. If the differences between digital recording 203 and original digital representation 111 exceed a threshold (307), there is an authentication problem and branch 309 is taken. The threshold will also depend on the kind of authentication being done. In branch 309, the existence of a problem is indicated to the application program that is doing the authentication at 311. Where it is useful, the program may also provide information about the comparison (315); again, the kind of information and the manner in which it is provided will depend on the kind of authentication. For example, if the amount in the amount field appears to have been altered, the program may display an image that shows which of the pixels of the original digital representation appear to have been altered in the digital recording of the visible authentication pattern. If the differences do not exceed the threshold, branch 317 is taken. There, the fact that no authentication problem has been detected is indicated to the application program that is doing the authentication. Both branches and the program terminate at 321.

Figure 4A:
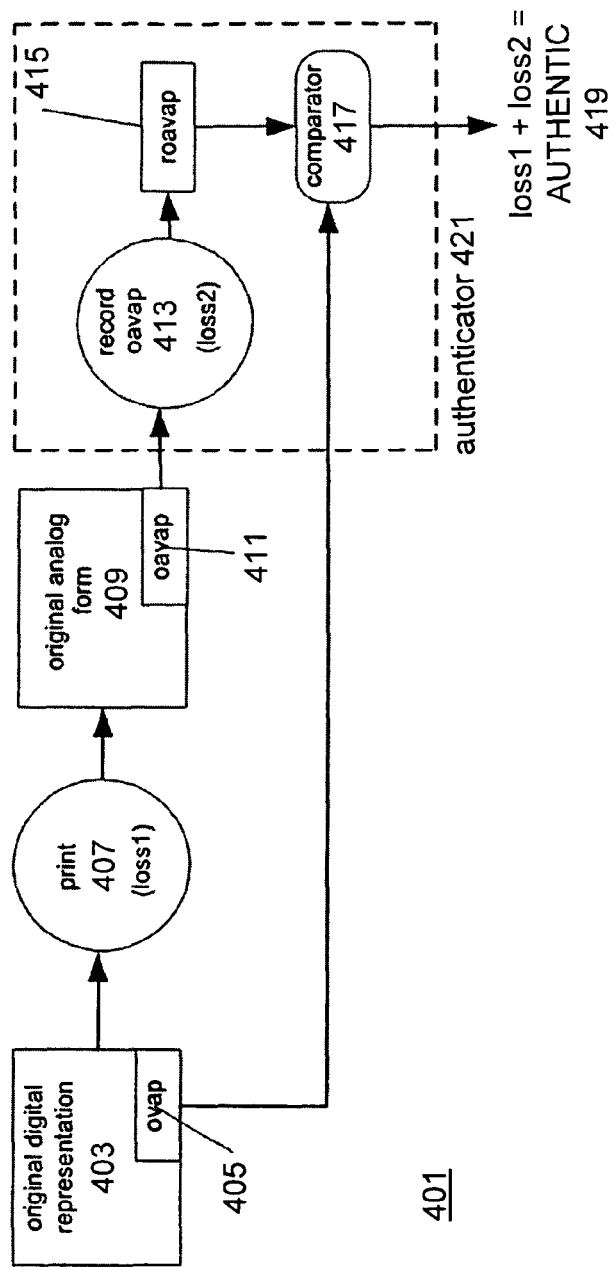
FIG. 4 is an overview of printing and authentication of original and non-original analog forms.
Figure 4B:
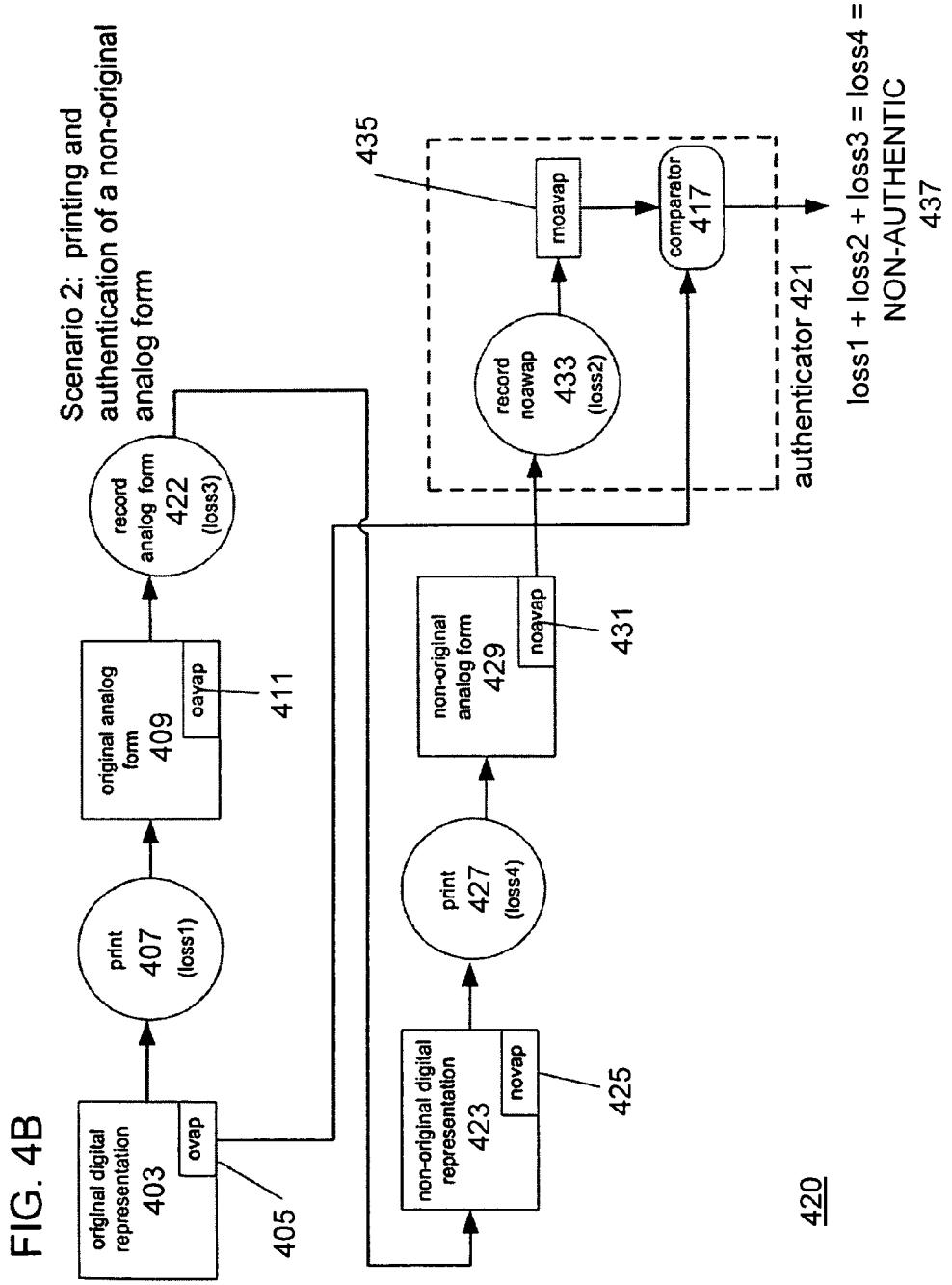

Using Visible Authentication Patterns to Distinguish an Original Document from a Non-Original Document: FIGS. 4, 5, One way a visible authentication pattern can be used to authenticate a document is by determining whether a document is an original, i.e., was printed from an original digital representation or is a non-original, i.e., was photocopied from document or was printed from a non-original digital representation, that is, a digital representation that was made from an unauthorized digital recording of a document. The reason a visible authentication pattern can be used in this way is that printing a document from its digital representation and making a digital representation of a document from a digital recording of it or photocopying a document always result in losses of information in the visible authentication pattern, regardless of how precise the printing, digital recording, or photocopying processes are; consequently, one can determine by comparing an original digital representation of a visible authentication pattern with a digital representation made by recording the visible authentication pattern from a document whether the document is an original or a non-original. In the case of an original document, the visible authentication pattern will have been printed once and digitally recorded once; in the case of a non-original document, the visible authentication pattern will have been printed and digitally recorded once to produce the original document from which the non-original document was made, and then, depending on how the non-original document was made, either photocopied or again printed and digitally recorded, resulting in a greater loss of information in the non-original document's visible authentication pattern than in the original document's visible authentication pattern.

The basic technique is shown in detail in FIG. 4. At 401 is shown how authentication using a visible authentication pattern works with an original document. Original digital representation 403 of the document contains an original visible authentication pattern (ovap) 405. Original digital representation 403 is then printed at 407 to produce original analog form 409. The printing operation causes loss1 in original analog visible authentication pattern (oavap) 411 in analog form 409. When authenticator 421 authenticates analog form 409, it makes a digital recording of oavap 411, resulting in loss2. The recording appears as roavap 415. Authenticator 421 then employs comparator 417 to compare ovap 406 with roavap 415. The difference between them is the sum of loss1 and loss2. That will be true when any otherwise undamaged roavap 415 is compared with ovap 405, and a difference of that size is a dependable indication that analog form 409 is indeed an original analog form.

At 420 may be seen how authentication works with a non-original document. The difference between the original document and the non-original document is that the non-original document is not printed directly from original digital representation 403 of the document, but instead from a non-original digital representation 423 of the document which has been made by digitally recording an original document 409 (422). As a result of the digital recording, the non-original visible authentication pattern 425 in digital representation 423 has suffered an additional loss of information which appears in FIG. 4 as loss3. When non-original analog form 429 is printed (427) from digital representation 425, another loss occurs in non-original analog visual authentication pattern 431, indicated as loss4. When non-original analog form 429 is authenticated by authenticator 421 as described above and rnoavap 435 made from noavap 431 is compared with ovap 405, the effect of loss3 and loss4 will show up as a greater difference between ovap 405 and movap 435 than there was between ovap 405 and roavap 415. Since noavap 431 in a non-original analog form 429 will always undergo the additional losses 3 and 4, the larger difference is a dependable indicator of a non-original document.

Non-original analog form 429 can of course be produced by any photocopying process as well as by the process of recording the original analog form (422) to make a non-original digital representation 423 and then printing (427) digital representation 423 to produce non-original analog form 429. The process of acquiring the image of original analog form 409 and then printing non-original analog form 429 from the image causes additional losses like those of losses 3 and 4, and consequently, rnoavap 435 produced in this fashion will still be less similar to ovap 405 than roavap 425.

Of course, if non-original digital representation 423 is itself made from a non-original digital representation, rnovap 435 will include the additional losses resulting from the photocopying or printing and digital recording of that non-original digital representation as well.

Obviously, if loss1 and loss2 were fixed values, the detector could always determine correctly whether the document is original or non-original. However, in general some variation will occur for each loss, for instance some originals could be printed with a better quality (fidelity) than others. It seems then that a statistical approach to detection should be employed.

Figure 6:
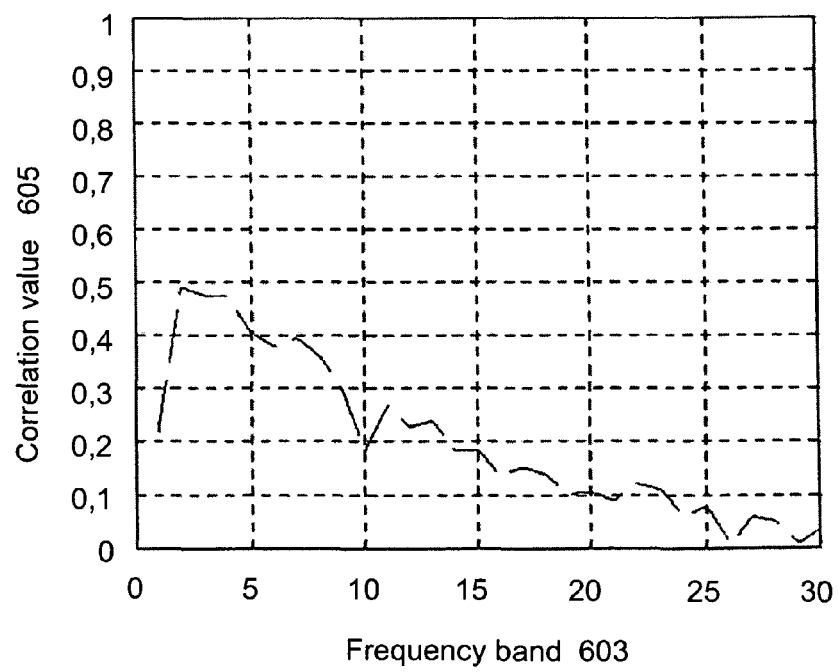
FIG. 6 is a graph showing correlation between energies in bands of frequencies in an original digital representation of a VAP and a VAP recorded from a non-original document.
Figure 7:
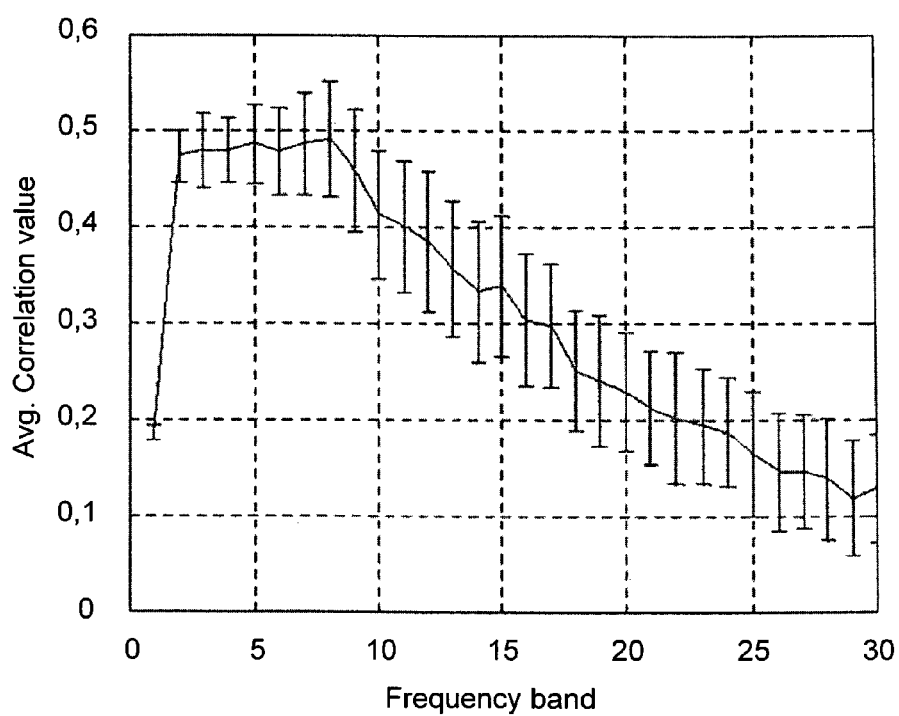
FIG. 7 is a graph showing correlation between energies in bands of frequencies in an original digital representation of a VAP and VAPs recorded from original documents.

Details of a Preferred Embodiment of the Technique for Distinguishing Between an Original and a Non-Original Document: FIGS. 6 and 7

An authentication technique is only as good as its reliability. The key to minimizing the probability of detection errors is the method for measuring how "different" a visual authentication pattern recorded from a document is from the original digital representation of the visual authentication pattern. The measurement method chosen must be based on properties of the VAP that are affected by the process of making a non-original document and must clearly distinguish an original from a non-original document.

Our approach is to consider the photocopying, recording, and printing processes as filters, more specifically as low-pass filters. Hence, high frequencies will be more attenuated than low frequencies by the printing and recording processes, and will lose more information at each record-and-print or photocopying step. For low frequencies in which a record and print or photocopying process preserves nearly all energy, a VAP in a non-original document may not have significantly less information the VAP in an original document. The very high frequencies may also not be helpful, since most of the energy at these frequencies in the VAP is lost the first time the VAP is printed. Consequently, even the VAPs of original documents contain very little information from those frequencies. Therefore, one must make an appropriate selection and/or weighting, of the frequencies used by the detector. The selection of frequencies for comparison, as well as the selection of a threshold for determining whether a document is original or non-original is typically done by training the comparison software on VAPs from original documents.

It should be pointed out here that the technique described above does not require a special visual authentication pattern. Instead, the entire document or a part of it can be used as the pattern. However, because many documents may not contain information at the energy levels necessary to determine whether a document is an original or a copy, it is better to use a visual authentication pattern which contains information at the proper energy levels. In the following, such visual authentication patterns will be termed copy detection patterns, or CDPs. The information in a CDP is distributed in appropriate frequencies. In a preferred embodiment, the original digital representation of the CDP is generated pseudo-randomly by a key, and consequently a program that has access to the key can create a new copy of the original digital representation of the CDP at any time. This key can be kept secret or revealed only to trusted parties. The copy detection pattern is inserted or printed on the document to be secured. In a preferred embodiment, analysis of a copy detection pattern from a document is done by digitally recording the document's CDP, using the key to generate a new copy of the original digital representation of the CDP, and comparing the recorded CDP with the original digital representation of the CDP. In other embodiments, the recorded CDP may simply be compared with a preexisting copy of the original digital representation of the CDP.

Algorithms Used in the Technique

This section describes the algorithms used for (1) generating an original digital representation of a CDP; (2) detecting and extracting a CDP from a document; (3) comparing the original digital representation of a CDP with a recorded CDP; and (4) determining whether a CDP is original or non-original. The manner in which the CDPs are compared in algorithm (4) and the thresholds for determining whether a CDP is original or non-original are determined by a training process in which algorithm (3) is used to gather training data.

Generating the Original Digital Representation of the CDP

The function make_pattern is used to create a digital representation (pattern_img) of a copy detection pattern that may be identified with a source of the digital representation from which an original document is made. make_pattern generates a noisy gray-scale or color pattern. A black border may also be added to the pattern to facilitate its detection in the document. The CDP may optionally also display a logo. The logo will typically affect the lowest frequency bands, and its impact on detection will be therefore limited. Typical values are given in the explanation of parameters.

pattern_img=make_pattern(type, height, width, key, filename, border, logo_img, logo_weight).

Parameters for Pattern Generation

Required:
1. Type: type of generated random number values, e.g. 'randn' (gaussian N(0,1)), 'rand' (equiprobable distribution), 'randint (binary +1 or −1 distribution), or MD5, SHA algorithms (0-255 integer number). The random number values are then used to compose a grayscale or color image.
2. Height: height of pattern in pixels (e.g. 104).
3. Width: width of pattern in pixels (e.g. 304).
4. Key: integer-valued secret key or password used as a seed for the random number generator.

Optional:
5. Filename: name of the file in which the pattern image is saved.
6. Registration mark (e.g. black border added on the sides of the pattern image, dots added at the four corners of the pattern image).
7. Logo_img: image to be used as background logo, automatically scaled to the dimension of the pattern image.
8. Logo_weight: value between 0 and 1 to weight the energy of the logo image (e.g. 0.2), which is superimposed on the pattern image.

An example of the use of pattern generation algorithm:
1. Generate pattern in a specific domain (e.g. DCT luminance or spatial in color RGB mode):
pattern=generate_pattern(type, height, width, key);
2. Transform the pattern to the spatial domain if the domain in the Step 1 is not spatial (e.g. inverse DCT):
pattern_img=transform(pattern);
3. If required round up pixel values p to integer values $0 \leq p \leq 255$.
4. Combine logo with pattern, for example, the mixing following function can be:
pattern_img=(1−logo_weight)*pattern_img+ logo_weight*logo_img;
5. Add registration mark (e.g. black border).
6. Dump image.

A pattern image may consist of multiple components/channels such as Red, Blue, Green, or YUV, which can be produced as described in Steps 1 and 2 above.

To combine a CDP with logo or background image, various mixing functions can be adopted. For example when the CDP is merged with a barcode (image), the CDP replaces only the black area of barcode and leave the white areas untouched.

Any shape (such as circle, oval) of the pattern image can be generated. A simple approach is to use a "shape mask" which defines an arbitrary shape represented by a two-dimensional array consisting of "1" and "0". Any shape can be created by applying the "shape mask" to the rectangle pattern image.

Detecting and Extracting the VAP from a Document

In this implementation, a digital recording of the document being authenticated is made and the black border on the VAP is used to locate the VAP in the digital recording. The black border results in a strong variation of luminance in the transition region, which is easily detectable. Other techniques for determining the location of the VAP may be used as well (egg existing features in the documents, black dots, etc.). Once the VAP has been detected, a digital representation is made of it which is comparable with the original digital representation of the VAP. This digital representation is the recorded VAP.

The original digital representation of the VAP and the recorded VAP are compared using the following function, that measures an index that indicates how "close" the recorded VAP is from the original digital representation of the VAP. The original digital representation of the VAP can be stored in the memory of the detector, or can be re-generated if the parameters used to create the original digital representation and the function make_pattern( . . . ) are available to the detector. The optional parameters used when combining the pattern with a logo may not be required, because the logo generally affects the properties of the pattern only slightly. The function for doing the comparison is analyze_pattern, which returns Results, and may take different parameters depending on the scenario that is actually applied:

Results=analyze_pattern (type, height, width, key, . . . , test_img);
OR
Results=analyze_pattern (orig_img, test_img);

Parameters and Output:
1. type, height, width and key: these are as explained for pattern generation.
2. test_img: test pattern image extracted from the document.
3. orig_img: original digital representation of the pattern
4. Results: contain all the results of the analysis. For example, it may include different measures of correlation or statistics, computed for different elements of the images eg different frequencies, different areas, different color channels, etc.)

The following example shows the steps of the algorithm the original digital pattern is regenerated and the subfunctions required for the algorithm:
1. (Optional) Remove the black border from the test CDP
2. Transform the test pattern image into the domain in which it was originally generated, for example, 8×8 block DCT: test_pattern=transform(test_img);
3. Regenerate the original CDP: pattern=make_pattern(type, height, width, key);
4. (Optional) Locally synchronize the test CDP with the original CDP as described below. (Optional) Apply certain image filters (such as sharpening) to the test CDP in order to produce a better correlation with the original CDP.
5. If required, convert the original CDP and test CDP into the domain where the comparison is to be made (eg 8×8 block DCT). Note that the comparison can be made in more than one domain, for example in both the spatial and frequency domains.
6. Compute several measurements of similarity between the original CDP and the test CDP for each channel in the transformed domain. For example, if patterns are generated and recorded in the color RGB domain, and the analysis is made in the 8×8 block DCT domain. Then there are 192 (i.e. 8×8×3) combinations by means of which the two patterns can be compared, and hence 192 measurements of similarity can be performed. The measure of similarity can itself be computed in several ways, for example by binning values and keeping only the one where there is a higher correlation, in order to exclude areas of the test CDP that may have been corrupted.
7. Collect and combine all similarity measures or measures based on other image features, in order to measure one or more indices of quality or of the "closeness" of the test CDP to the original CDP. The combination function can be any function that combines the different inputs, for example a function that combines similarity measures by assigning more weight or importance to features that are better discriminants between the original CDP and the test CDP.

As already explained above, a duplication process will always degrade the original CDP, and in general it is expected that the different measures of closeness or quality will be lower for a CDP that is recorded from an analog form. However, due to statistical variations, an adequate selection and combination of the different measures can be more effective in determining whether a test CDP is recorded from an original analog form or from a non-original analog form.

FIG. 6 shows the correlation (shown at 605) between the energies of the frequencies in the original CDP and the test CDP from the document being authenticated for thirty bands of frequencies (shown at 603). As expected, the correlation between the energies is highest in the low frequency bands from which little information is lost in the copying process and lowest in the high frequency bands where even a single printing operation causes the loss of most of the information. If the correlations are substantially lower in the middle frequency bands than they would on average be for CDPs from original documents, the CDP is not an original, and therefore neither is the document being authenticated. That is the case for the plot of FIG. 6, which thus shows that the document being authenticated is not an original.

Other image features can also be considered when the correlation values by themselves are not sufficient to determine whether a document is an original analog form or a non-original analog form. Additional image features which can be used for producing correlation values between the original CDP and the test CDP include:
    color histogram
    edge, line and outlines
    frequencies in other domains (such as Fourier and Wavelet domains)
    brightness and contrast Detecting Whether a CDP is from an Original or a Non-Original Document The function detect_pattern analyzes the results returned by analyze_pattern and returns the value Output, which indicates whether a CDP is from an original document or a non-original document.
    Output=detect_pattern (Results, Parameters)
    Results: can be a scalar value or a vector, the output of the function analyze_pattern.
    Parameters: values required to adjust the behavior of the detection function, which may depend on the requirements of the application and the conditions under which it performs detection.
    Output: different output values are possible. In its simplest form, Output may take three values: ORIGINAL, NON-ORIGINAL, or PROCESSING-ERROR. The last output may occur when the pattern is badly recorded. Output may return more detailed information, for example, NON-ORIGINAL can further indicate how the test pattern from the non-original document was produced (eg duplication, photocopy, regeneration, etc.). Output can further provide indexes of quality or closeness.

Here is an example of the algorithm for a simple detection function:
1. Combine the various Results values returned by analyze_pattern to obtain a scalar value S. One way of doing this would be to make S by summing the returned Results.
2. If S>T1 then output is ORIGINAL, else if S>T2 then output is NON_ORIGINAL, else the output is PROCESSING ERROR.

Here T1, and T2 are two scalar parameters typically obtained via a training process, with typically T1>T2.

Local Resynchronization of the CDP from the Document with the Original CDP

In order to compare the CDP recorded from the document with the original CDP, the recorded CDP must be synchronized with the original CDP. One way to do this is to use synchronization points in the recorded CDP, for example, black border 601, to synchronize the original. Once the CDPs are synchronized, the comparison between them is done pixel-by-pixel or block by block.

When there have been errors in printing the CDP in the document or in the digital recording of the CDP from the document, the CDPs cannot be perfectly synchronized by this method. For example, there might be less than a pixel shift between the original CDP and the one recorded from the document. Furthermore, the shift may vary along the pattern: in some cases the upper part of the recorded CDP may be shifted downward compared to the original CDP and the lower part be shifted upward (or vice-versa, of course). These shifts may be very hard to notice, may not occur consistently, and may vary locally in the recorded pattern. They are generally caused by slight instabilities in the printer, but can also be caused by similar instabilities in the recording device.

These unpredictable sub-pixel shifts may reduce the detector's performance: because of these misalignments, some CDPs from original documents may be detected as being from non-original documents. One method of handling these "pathological" CDPs from original documents, and in general of improving the stability of the CDP detection is to locally resynchronize the CDPs in order to correct the local misalignments. There are several ways to perform local resynchronization, but the general idea is to use the recorded CDP itself for local resynchronization.

One way to perform local resynchronization is to divide the original CDP into blocks (non-overlapping blocks are preferred, but the blocks could also overlap) and find which block of the recorded CDP has the closest match with a given block of the original CDP. If there were no misalignment, the block of the recorded CDP that most closely matched the given block would be at the same position in the recorded CPD that the given block had in the original CDP: for example, the best match for the 10×10 block with starting position (80,80) and ending position (89,89) of the original CDP would be the corresponding block (80,80) to (89,89) of the recorded CDP. However, if there is a misalignment, the best match could as well be with block (81,80) to (90,89) (shift of one pixel to the right). If that is the case, then the recorded pattern will have the block (81,80) to (90,89) shifted 1 pixel to the left, to position (80,80) to (89,89). The same idea can be applied to each block in the recorded CDP, to produce a "locally resynchronized" CDP.

Local resynchronization requires a couple of parameters and functions. First, we must define a measure of distance between each block of the original CDP and a block of same dimensions of the recorded CDP. A convenient measure for this purpose is the standard correlation coefficient. It is also necessary to set the dimensions of the blocks into which the original CDP is divided: typically a block of dimension 8×8 or 16×16 can be used, but in general blocks of size N×M can be used. As mentioned earlier, blocks can be overlapping, in which case the amount of overlap between successive blocks needs to be defined. Another parameter to set is the search range or search area: starting from matching positions, how far should the algorithm look for a matching block? This is set with a parameter n, where for block starting at position (x,y) of the original CDP, all blocks with position (x+/−i,y+/−i), 0<i<n, are tested.

It is also possible to scale the digital and recorded CDPs before doing local resynchronization: this allows a finer grain match. For example, by scaling the two CDPs by 2, we can recover half pixel shifts. And finally, the synchronization algorithm can be applied iteratively on the resynchronized CDP until no further improvement is found.

Once the resynchronization is performed, an arbitrary measure of similarity/distance between the resynchronized recorded CDP and the original CDP can be performed. A simple correlation, or a local frequency analysis can be performed, perhaps with parameters based on a training set. These measures, which typically make an average of certain quantities on the whole CDP, may however not always be robust against some local damage to the scanned CDP that may occur in certain applications. For example, in some cases one area of the CDP may have been badly printed, or may have been damaged by scratches, writing, or water. In other cases the scanning device may have inserted distortion into the scanned CDP; that problem typically occurs with feed-through devices when the document is not correctly inserted. To make the CDP more robust against these kinds of distortion, more robust measures of similarities may be used: one such measure is the median local correlation coefficient, where a correlation coefficient is computed for each block of the CDP, and the median of all local correlation coefficients is computed. Here, computing a median instead of an average makes the detector significantly more robust to local alterations. To cope with a larger amount of corrupted areas in the CDP, it is also possible to compute the average of only the 20% best local correlation coefficients, which can be assumed to be non-corrupted. In one implementation, this procedure of computing is this sort of "biased" average is applied separately to each frequency channel, and optionally to different color channels. Of course, the foregoing synchronization techniques can be applied not just with CDP's, but with any recorded visible authentication pattern that needs to be synchronized with an original visual authentication pattern.

Applications of CDPs

CDPs can be used in any situation where it is useful to distinguish an original document from a non-original document. A CDP may be printed by any process which prints the CDP with sufficient fidelity so that a digital recording of the CDP is comparable with the original digital representation of the CDP. The pattern may be particularly adapted to detect non-original documents made by particular photocopying, scanning, or printing techniques. Particular uses of CDPs include:

1. Printing a CDP on packaging for brand protection
2. Printing a CDP on checks and currency for copy detection
3. Printing a CDP on valuable documents including certificate, contracts, and the like for verifying whether the document is the original or a copy.
4. Printing a CDP on holograms
5. Printing a CDP on labels on valuable goods such as aviation/automobile parts or pharmaceuticals.

More generally, a CDP may be used in any application where it is desirable to be able to determine what processes have been applied to a document. The pattern may of course be varied as required to best detect the processes of interest.

CDP can also be used for the following applications:

1. Benchmarking of Printing Quality

When reading the CDP, a quality index of the digital recording of the CDP is computed. This quality index will vary on printing quality, paper/substrate quality, or digitization/scanning (device) quality. The CDP quality index can then be used to quantify the quality of a certain printing process, a certain substrate or a certain scanner.

2. Quality Control

In the same vein, a CDP reader can be used in a printing production process for automatic quality control. The advantages of the CDP over manual inspection is that it gives an automated, objective, and precise measure of quality.

3. Tracing

The CDP has a structure and characteristics that is associated with the printer, paper, camera, and usage and wearing. In principle, analysis of the CDP can determine the general "history" of the document: how it was printed and what "wear and tear" it has suffered.

Figure 10:
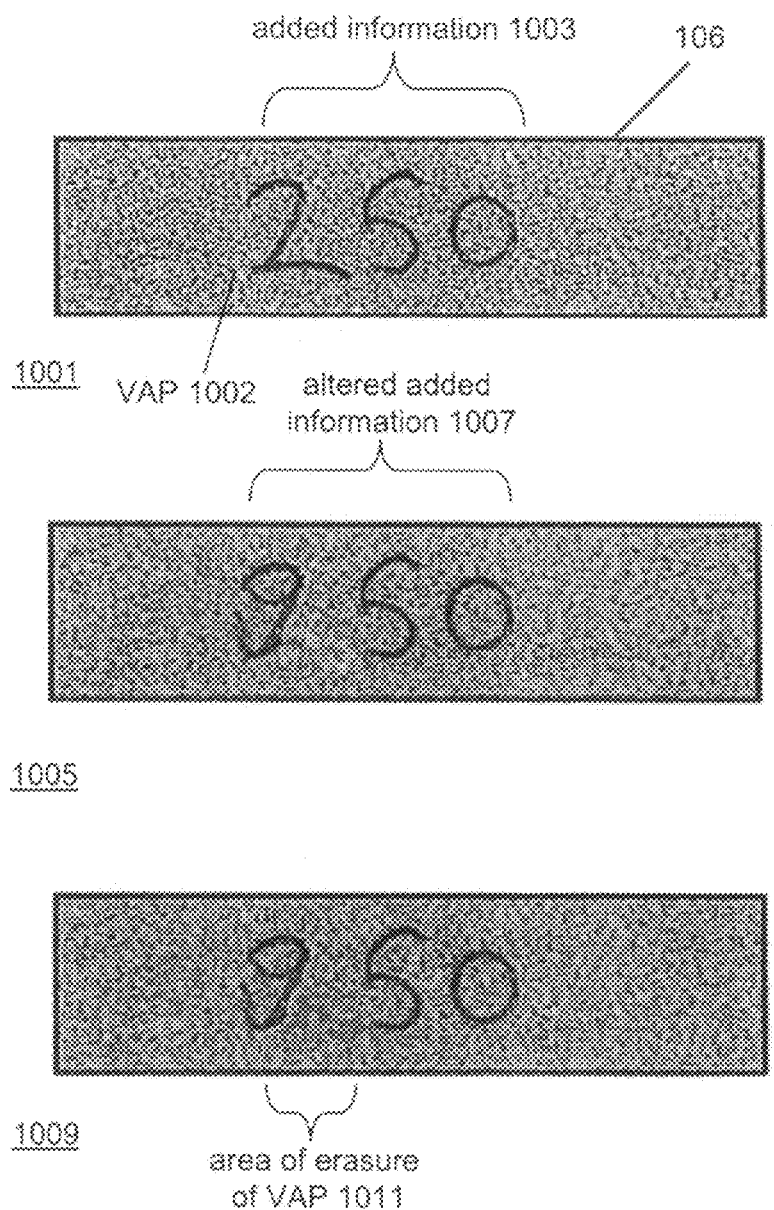
FIG. 10 shows how a VAP may be used to detect alteration of a document.

Using Visible Authentication Patterns to Detect Alterations in Documents: FIG. 10

Certain classes of documents are always "modified" after they are printed. One common example of this is a check that is printed with blank fields that are filled in when the check is written. A problem with documents belonging to all of these classes is that what is placed in the filled-in fields may be altered later. Thus, even though the check itself is authentic, the semantic values of what was written in the blank fields may be changed. For example, a payee of a check can modify the amount on a check that is addressed to him (e.g. from "one hundred" to "nine hundred"), in a way that is difficult for a teller to notice.

This kind of problem is hard to solve because the forgers do not actually create counterfeit documents; instead, they alter the semantic value of authentic documents. The problem is made harder by the fact that the filled out authentic document already contains legal modifications. The problem is, how are the legal modifications to the document to be distinguished from later illegal modifications.

One of the solutions to this problem is forensic examination. If the teller suspects that the check has been modified, he can bring it to another authority for further examination. However this task is manual, costly, and time-consuming and it is clearly not possible to apply it systematically to every document or check. Often, the counterfeiter forges a check by first erasing a part of the writing. For example, to modify the amount from "two hundred" to "nine hundred", he will probably erase the "two" and modify it to "nine". To erase handwriting, he will often use chemical products. Another possibility is to scrape the original amount from the check, repaint the background, and then write in the new amount.

Visible authentication patterns can be used to detect these illegal modifications. The general idea is to print a VAP in each of the areas of the document where we may want to detect illegal modifications. The legal modifications are then made by writing on the VAP. The precise, unique and uncopyable VAP structure can be used later on to detect modifications and to determine if the modifications are acceptable. The idea is that both writing on a VAP and erasing something written on a VAP produce detectable modifications of the VAP. Writing on the VAP destroys the pattern, as does scraping writing off of the VAP or applying a chemical erasing agent to the VAP. A VAP{that is used in this fashion is termed in the following a modification detection pattern, or MDP.

How a MDP may be used to detect illegal modifications can be summarized as follows:
  insert an MDP in each area of the document which needs to be protected against unauthorized modifications.
  When verifying the authenticity of the document, first record an image of each of the MDPs in the document.
  for each recorded MDP, compare the recorded MDP with the original digital representation of the MDP to detect areas where the MDP has been damaged.

The results of the comparison of the recorded MDP with the original digital representation of the MDP can be used in a number of ways:
  Display the results of the comparison with the damaged areas highlighted to a decision maker. This will show both the areas that contain writing and the erased areas.
  Display the results of the comparison with non-written damaged areas highlighted to the decision maker.
  Compare the size of the damaged area with the size of the area that has been written on, and if the difference is above a threshold, treat the field has having been modified.

FIG. 10 shows how a MDP can be used to detect modifications. At 1001 is shown a MDP 1002 that is used in an amount field for a document. As before, MDP 1002 is surrounded by black border 106. As shown at 1003, the amount 250 has been written into MDP 1002. At 1005 may be seen how a forger has modified the amount $250 to the amount $950 by erasing the "tail" of the 2 and adding a loop to make it into the number 9. To cover up the erasure, the forger has imitated the pattern of the MDP. The imitation is still visible in 1005, but even as shown, it is good enough to get by a harried teller and a skilled forger can easily make the imitation better.

The problem for the forger is that the erasure has destroyed the MDP. By scanning the MDP and locally analyzing it, it is possible to detect with high accuracy which part of the MDP has changed from the original. Erasures can be detected by finding areas in the MDP which neither contain neither text nor the original pattern. This is shown at 1009. Text areas are easy to find because they are typically color-uniformed and darker than the MDP. All that then need be done to find the erased areas is to compare the areas of the recorded MDP that do not contain text with the original digital representation of the MDP. The erased areas show up as parts of the recorded MDP that do not match the original digital representation, as shown at 1011. In a preferred embodiment, such non-matching parts appear in red.

A few more details on the algorithm for using an MDP to detect alteration of a document:
  Making MDPs: A MDP may be made in any way that a VAP is made, but then the pixel values are increased to make the MDP brighter (otherwise, the text written on the MDP could not be easily distinguished from the MDP).
  Use registration marks (e.g. black border or corner marks) to extract the recorded MDP from the document.
  Detect text areas: A low-pass filter is applied to the recorded MDP, and pixels with values under a threshold are considered to be part of the text and legal modifications.
  Detect modifications of the MDP: after local resynchronization is applied, a correlation coefficient is computed for each block of the MDP. As shown in 1009 one can see that the areas of the text and the areas of the illegal modification were altered.
  By excluding the legal modifications (at 1003) from image 1001, several algorithms can be applied to detect the illegal modifications. One possible way is to first classify areas into modified or non-modified (by thresholding the local correlation), then apply a noise processing algorithm or low-pass filter that removes individual or non-significant modified areas. Region detection algorithms can also be applied to find significant modified regions. The result is displayed in 1009: the non-allowed modifications are displayed in red, while the allowed one (on the text) areas displayed in green.
  Depending on the amount of non-allowed modifications, a decision can optionally be taken on the authenticity of the document to which the MDP belongs.

Implementation Details of the VAP
Form of the VAP in the Document

Figure 11:
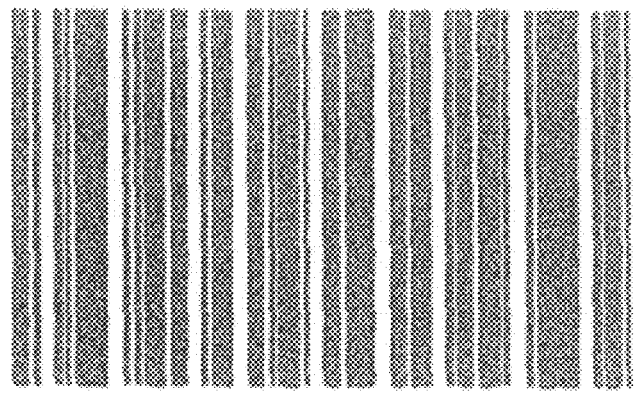
FIG. 11 shows how a VAP may be incorporated into a bar code or into a logo.
Figure 11:
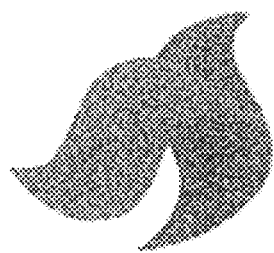

All that is required for using a VAP to detect alterations in an analog form is that there be an area in the analog form that has a pattern which will serve the purpose and an original digital representation of the pattern that can be compared with the pattern as recorded from the analog form. It will thus be possible in some cases to use a preexisting pattern in an analog form for the technique. More usually, though, the VAP will be included as part of the design of a new analog form. There is of course no need to hide the VAP in the analog form, and indeed in some cases, its presence may be advertised to reassure customers that illegitimate analog forms can be detected. On the other hand, the VAP can have any shape, and thus can easily be built into other features of the analog form. FIG. 11 shows two examples. At 1101 is shown a barcode whose bars make up the VAP. At 1103 is a logo which contains the VAP. There may of course be more than one VAP in a document and more than one VAP may share a location. This can be done by giving each pattern a weighted value such that the weights of all of the patterns sum up to one, e.g.:

Final_pattern=a*pattern1+(1−a)*pattern2, where 0<a<1

One application of multiple patterns would be the authentication of contracts, where each party adds its own pattern when it signs the contract or otherwise terminates a stage in the negotiations.

It is also possible to insert several CDPs on a document at different places, typically produced with different keys, to enable multiple parties to verify their own CDP without being able to verify the CDP of the other parties (and consequently being able to duplicate them). It is even possible to generate a CDP using different keys (each key may control different spatial or frequency area of the CDP), to enable different parties to verify the CDP. This way, if one party releases his key, this key is not sufficient to make an exact duplication of the CDP (all keys are necessary), and the security is not compromised. This is analogue to the concept of "Shared Secrets".

Registration of the VAP

The preferred embodiment employs black box 106 as registration for the VAP. However, many other registration techniques are possible. For example, one could use visible patterns such as frames, bar codes, or the like already displayed on the package to locate the VAP, as well as OCR. One can also use UV marks or any techniques discussed in the parent patent application U.S. Ser. No. 10/287,206, J. Zhao, et al., Apparatus and methods for improving detection of watermarks in content that has undergone a lossy transformation, filed Nov. 4, 2002. Also, one could also make the Fourier-Mellin transform of the recorded VAP and match it with the VAP's original digital representation.

For some applications, it is difficult to know if the orientation of the digital recording of the VAP is correct, or if it should be flipped upside down (180 degrees rotation) before reading. To avoid having to analyze the VAP one time, and then, if the analysis is not successful, to rotate it in the opposite vertical orientation and analyze it again, it is possible to design a symmetric VAP: the lower part is a mirror of the upper part. The VAP can then be analyzed independently of its vertical orientation.

Properties of the VAP's Pattern

The pattern can be a grayscale pattern or it can be a colored pattern. In the latter case, different color channels can be employed, for example RGB and YUV. The pattern can also be generated in various frequency domains, for example spatial, wavelet, DFT, or DCT domains.

Generating the VAP

The noisiness, i.e., random nature, of the VAP is what makes it difficult for counterfeiters and forgers to deal with it. Any technique which can produce a random or pseudo-random pattern will do to generate the VAP. In the preferred embodiment, generation is done by providing a value to a pseudo-random number generator which generates a sequence of random numbers that is unique for the value. The value thus serves as a key which may be used to generate new copies of the pattern. Different pseudo-random number generators may be used in different embodiments and the probabilistic frequency values for the generated random numbers can be taken from different probability distributions. The key can also be used to determine the locations in the VAP upon which analysis is performed. As will be explained in the discussion of using the VAP to carry other information below, the key may include such other information. In some applications, the key used for designing the pattern may not be revealed to other parties. In that case, any useful way of distributing keys may be used, for example asymmetric keys or public-private key pairs.

The pattern may be combined with a logo, either by adding the logo to the pattern or vice-versa. The logo can be any existing image or document, including images serving other purposes (a 2-D bar code, a watermarked image, etc.). It is also possible to apply any process such as filtering to the pattern or to the logo in such a way that the logo will minimally interfere with comparing the recorded VAP with the original digital representation of the VAP.

Printing the VAP

The quality of the authentication provided by a VAP depends completely on the fidelity with which the VAP is printed on the document. Authentication errors can be reduced if a "quality control" step is added at the end of the printing process to guarantee the fidelity of the VAP:

1. each printed VAP will be passed to an automatic verification process to check if the authentication pattern has the minimum quality which is required for it to be recognized as an original.
2. If the quality is below the minimum quality, an alert will be issued and the document/package containing the authentication pattern will be re-printed.
3. Such verification can also serve as a "quality control" for printing quality or errors introduced by the printer.

The generation of the VAP can be adapted to the printing technology. For example, if a laser printer printing only binary dots is used, then a binary dot VAP can be generated to better use the possibilities of the printer. Also, a VAP might be more adequately generated, and printed, in the color space of the printer. If a certain printer uses specific inks (eg CMYK), it can be more effective to generate the VAP in that domain than in the RGB domain. If the VAP is engraved in metal with a laser engraver able to produce only binary dots, then it would make more sense to generate a binary VAP.

Using the VAP to Carry Other Information

Three approaches to using the VAP to carry other information are discussed in the following: reserving certain areas of the VAP to hold information, using the other information to generate the key used to make the original VAP, and adding a watermark to the VAP. The disadvantage of adding a watermark is that it reduces the ability of the VAP to detect non-original analog forms or modifications in the VAP.

Reserving Areas in the VAP to Hold Information

Certain areas (e.g. 8×8 blocks) of the VAP can be reserved to hold information. In those areas, the structure/characteristics of the VAP is not actually used to verify its authenticity, but to store some bits of information. These areas can be selected pseudo-randomly using a key, such that an entity which does not have the key cannot determine whether an area in VAP is actually used to store information or to determine the authenticity of the VAP. In an area that is used to hold information, a certain structure/characteristics of the VAP can correspond to a certain bit value ('0' or '1') of information. This bit-dependent structure/characteristics can of course vary as determined by the key. Note that the reserved areas and the information they contain are part of the VAP as generated. They thus do not degrade the ability of the VAP to detect unauthentic documents. One use of the reserved areas it to store the key used to generate the VAP.

Using the Information to Generate the VAP's Key

This discussion uses the following terminology: The VAP is created and detected with a key P; we may want to use a different key S to embed a message in the pattern as described either above with regard to the reserved areas or below with regard to watermarks; a message M is embedded in the VAP using the key S; finally additional information I might be printed visibly on the document (serial number, barcode, etc.), or UV-coded invisibly, within the pattern or outside of it, or be obtained from an external source.

Fixed Pattern Key

In one embodiment, the VAP creation key is fixed P. This is typically the case for standard offset printing technology, where the printing technology does not have the ability to change the pattern dynamically for each package/product/document. The key can be kept secret as described above or may be incorporated into other security features. For example, it could be printed in UV inks on the document. The fixed pattern key can be used for brand protection or document protection generally.

Variable pattern key In another embodiment, the VAP's key depends on a secret key S and some other information I. This other information I may be displayed on the document (within the pattern or outside of it) or obtained from an external source. The information from the document can be for example a serial number, a text, a barcode etc. Information from an external source may for example be a value that is associated with the VAP and known to the person who is checking whether the document containing the VAP is authentic. The pattern key may be any arbitrary function $P=f(S,I)$ of the parameters that are the secret key and the information I. A simple function would be to concatenate or sum the two parameters, but many other functions are possible, such as a hash value of a combination of the two parameters, etc. At detection time, the printed information I is extracted with an appropriate technology—bar code reader, OCR, etc—. Then the pattern key is generated as $P=f(S,I)$, and the pattern is analyzed. Typical uses include brand protection with digital printing.

Watermarks in the VAP

It is possible to embed a visible or invisible watermark in the VAP using any watermarking technique. The watermark may serve multiple purposes. It may contain any information, including only a single bit, as described above, or aid registration of the pattern. The watermark can either be detected with the key used to generate the VAP or with another key such that its reading is restricted to another user or group of users. A third possibility, explained below, is to use the message carried by the watermark to derive the key used to generate the VAP.

When a digital watermark is embedded into to a VAP, the VAP will be slightly modified. As a result, when the same VAP is used for authenticity verification, its reliability for that purpose may be reduced. As an alternative, the digital watermark can be embedded into areas in the VAP that are reserved to store information as explained above.

Watermarks and Keys

In another embodiment, the pattern creation key P is derived from the secret key S and the message M embedded as a digital watermark in the copy detection pattern. In this case, M takes the place of the information I used to create the variable pattern key discussed above. At creation time, the pattern key P can be any function of the secret key S and the message M, $g(M,S)$. The pattern is generated in the usual way, then a watermark is inserted into the pattern, where the watermark encodes the message M using the secret key S as a parameter. At detection time, first the watermark message M must be read from the pattern with the secret key S. Once M is known, the pattern key $P=g(M,S)$ is derived, and the pattern is analyzed.

In this application framework, no auxiliary technology would be needed to extract more information printed on the package. It is however possible to also use the information I printed on the package in several ways within the principle described here. For example, the secret key S can be used in combination with the information I to produce a watermarking key W, i.e. $h(S,I)=W$, which is used to embed the message in the pattern. Then the pattern key is generated in the same way as before, $P=f(M, W)=J(M,h(S,I))$. In general, VAPs may be combined with watermarking technology and other reading technology (OCR or barcode readers, for example), are to produce different levels of verification.

Comparing VAPs

How recorded VAPs are compared with original digital representations of VAPs will depend on how the VAP is made and what its purpose is. Some generally-applicable variations include evaluating certain areas independently, either to have more clues on what process has been applied to the document or for security features. As described above, a VAP may contain more than one authentication pattern, and the different patterns may be analyzed by different groups.

Before VAPs can be meaningfully compared, the comparison program may have to be "trained" with VAPs recorded from original documents, as described above for CDPs. The training establishes the thresholds for determining whether a VAP recorded from a document whose authenticity is being examined is authentic or not. The meaning of the threshold will of course depend on the kind of alteration that the VAP is being used to detect. Retraining is required whenever the manner in which the original documents are printed varies in a manner which affects VAP comparison. Training can be done automatically by printing a number of VAPs on a sheet of paper, scanning the sheet, and providing the scan to training software.

In another embodiment, instead of comparing the digital recording of a test VAP to a corresponding digital representation to measure its quality index, it is possible to compare the digital recording to a digital recording of another VAP (typically an original VAP that was scanned).

Environments in which VAP Analysis is Performed

What is required to do VAP analysis is a device that can record the VAP from the document to make the recorded VAP, a copy of the original digital representation of the VAP, and a processor which can compare the recorded VAP with the original digital representation of the VAP. The recorder and the processor may be local to one another or connected by a network. The network may be either a local area network (LAN) or a wide area network (WAN). An example of a local environment is a processor is a PC that has a scanner, a copy of the analysis code, and a copy of the original digital representation of the VAP. The copy of the original digital representation of the VAP may either be downloaded or generated locally using a key. Results of the analysis are output to the PC's display device.

In a network environment, scanning, analysis, and the original digital representation of the VAP may be distributed across the network in any fashion. A distribution that maintains the security of the original digital representation of the VAP and simplifies the equipment needed at the local level is one in which scanning is done in a device which is connected to a WAN. When the VAP on the document has been scanned to produce the recorded VAP, the recorded VAP is sent to a location in the WAN at which both the analysis code and an original digital representation of the VAP are available. The original digital representation may be either stored or regenerated on demand. The analysis is done at that location and only the result of the analysis is returned via the WAN to the device used for scanning. In network environments generally, information carried in or sent with the recorded VAP may be used to retrieve information for use in the analysis. For example, the document may contain a serial number, and the serial number may be sent with the recorded VAP to the location that does the analysis. If there is an association between VAPs and serial numbers, the serial number could be applied to a database at the location or elsewhere in the network to retrieve the either the key for the original digital representation of the VAP that should be compared with the recorded VAP or a copy of the original digital representation of the VAP itself. As described above, the serial number could be specified in a barcode that contained the VAP, as a visible watermark in the VAP, could be OCR'd from the document, or even could be input by the person doing the scanning.

A camera (webcam, camcorder, etc.) can be also used to capture images of the VAP. In this case, the VAP detector receives not only one image as input, but a constant stream of images. The additional information provided by several images can potentially be very useful in the analysis. However, as the time required to analyze one image can be significantly larger then the time between two successive images, the use of the stream of images can be optimized. For example, images that appear to have the properties for a correct reading (good sharpness, VAP wholly contained in the picture), can be selected from the stream and used for analysis.

Combination of VAPs with Other Security Technologies

A VAP can be combined with other technologies targeted at making analog forms more secure. For example, the VAP can be used with information hiding techniques such as digital watermarking, with machine-readable information such as 1-D or 2-D bar codes, with holograms, or with any other technology that can be applied to an analog form. The relationship between technologies can be multifarious: as an example a 2-D bar code can contain independent information, or the secret key needed for the pattern analysis, or inversely, the VAP can hold the key required for decoding the 2-D bar code or the 2-D bar code can contain the VAP.

CONCLUSION

The foregoing Detailed Description has disclosed to those skilled in the relevant technologies the inventors' techniques for determining whether an analog form of an object is an original analog form or a non-original analog form, their techniques for using VAPs to perform authenticity checks on analog forms, and their techniques for using VAPs to hide messages in analog forms and has further disclosed to those skilled in the relevant technologies the best mode presently known to the inventors for practicing the techniques. It will be immediately apparent to those skilled in the relevant technologies that many embodiments of Applicants' techniques other than those disclosed herein are possible. For example, the size, shape, and pattern of a VAP will be determined by the nature of the analog form the VAP is being used with and by the VAP's purpose. How a VAP carries additional information and what that information is will also be determined by the nature of the analog form and by the VAP's purpose. In general, VAPs may be used in any situation in which changes made after the original analog form is made are to be detected. While the application discloses VAPs printed on documents, analogues to these printed VAPs may be placed on analog forms in other media.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A method of determining whether an analog form of an object is an original analog form, the method comprising:
    comparing at least a portion of a digital recording made from the analog form, the analog form having an authentication pattern, with an original digital representation of the portion to determine a degree of dissimilarity between the recorded portion and the original digital representation of the portion; and
    using the degree of dissimilarity to determine whether the analog form is an original analog form;
    wherein the authentication pattern depends on a key and other information, the other information being displayed on the analog form; and
    reading a bar code or reading a watermark or using OCR to extract the other information from the analog form, the key is generated on which the authentication pattern depends from the extracted other information, and the original digital representation is generated in dependence on the key.

2. The method according to claim 1, wherein the other information is a serial number.

3. The method according to claim 1, wherein the other information is a serial number, the serial number is applied to a database, a copy of the original digital representation is retrieved from the database and said copy is compared with the recorded portion of the authentication pattern.

4. The method set forth in claim 1, wherein the method is practiced in a node in a network and the method further comprises receiving the digital recording from another node in the network.

5. The method set forth in claim 1, wherein the method is practiced in a node in a network and the method further comprises returning an indication to another node whether the analog form has been determined to be an original analog form.

6. A method of determining whether an analog form of an object is an original analog form, the method comprising:
    comparing at least a portion of a digital recording made from the analog form, the analog form having an authentication pattern, with an original digital representation of the portion to determine a degree of dissimilarity between the recorded portion and the original digital representation of the portion;
    using the degree of dissimilarity to determine whether the analog form is an original analog form; and
    using another pattern displayed on the analog form to locate the authentication pattern;
    wherein the authentication pattern depends on a key and other information, the other information being displayed on the analog form; and
    reading a bar code or reading a watermark or using OCR to extract the other information from the analog form, the key being generated on which the authentication pattern depends from the extracted other information, and the original digital representation being generated in dependence on the key.

7. The method according to claim 6, wherein the other pattern is a visible pattern or a UV mark.

8. The method according to claim 6, wherein the other pattern is at least one of a frame, and black dots.

9. The method according to claim 6, wherein a back box or a watermark is provided as registration for the authentication pattern.

10. The method according to claim 6, wherein the other information is a serial number.

11. The method according to claim 10, wherein the authentication pattern includes areas that are reserved for holding information and that are not used to verify authenticity.

12. The method according to claim 11, wherein the watermark is embedded into said areas in the authentication pattern that are reserved for holding information.

13. The method according to claim 6, wherein the other information is a serial number, the serial number is applied to a database, a copy of the original digital representation is retrieved from the database and said copy is compared with the recorded portion of the authentication pattern.

\* \* \* \* \*